(12) United States Patent
Mathew et al.

(10) Patent No.: US 8,681,439 B2
(45) Date of Patent: Mar. 25, 2014

(54) SYSTEMS AND METHODS FOR HANDLING SECTOR GAPS IN INTER-TRACK INTERFERENCE COMPENSATION

(75) Inventors: George Mathew, San Jose, CA (US);
Jongseung Park, Allentown, PA (US);
Shaohua Yang, San Jose, CA (US);
Erich F. Haratsch, Bethlehem, PA (US);
Ming Jin, Fremont, CA (US)

(73) Assignee: LSI Corporation, San Jose, CA (US)

( * ) Notice: Subject to any disclaimer, the term of this patent is extended or adjusted under 35 U.S.C. 154(b) by 354 days.

(21) Appl. No.: 13/186,197

(22) Filed: Jul. 19, 2011

(65) Prior Publication Data
US 2012/0063024 A1    Mar. 15, 2012

Related U.S. Application Data

(60) Provisional application No. 61/453,676, filed on Mar. 17, 2011, provisional application No. 61/453,680, filed on Mar. 17, 2011, provisional application No. 61/382,117, filed on Sep. 13, 2010.

(51) Int. Cl.
*G11B 27/36* (2006.01)
*G11B 5/00* (2006.01)

(52) U.S. Cl.
USPC .............................. 360/31; 360/50

(58) Field of Classification Search
None
See application file for complete search history.

(56) References Cited

U.S. PATENT DOCUMENTS

| | | | |
|---|---|---|---|
| 5,278,703 | A | 1/1994 | Rub |
| 5,278,846 | A | 1/1994 | Okayama et al. |
| 5,317,472 | A | 5/1994 | Schweitzer, III |
| 5,325,402 | A | 6/1994 | Ushirokawa |
| 5,392,299 | A | 2/1995 | Rhines et al. |
| 5,471,500 | A | 11/1995 | Blaker et al. |
| 5,513,192 | A | 4/1996 | Janku et al. |
| 5,523,903 | A | 6/1996 | Hetzler et al. |
| 5,550,870 | A | 8/1996 | Blaker et al. |
| 5,612,964 | A | 3/1997 | Haraszti |
| 5,701,314 | A | 12/1997 | Armstrong et al. |
| 5,710,784 | A | 1/1998 | Kindred et al. |

(Continued)

FOREIGN PATENT DOCUMENTS

| | | |
|---|---|---|
| EP | 0522578 | 1/1993 |
| EP | 0631277 | 12/1994 |

(Continued)

OTHER PUBLICATIONS

U.S. Appl. No. 13/186,213, filed Jul. 19, 2011, Mathew, George et al.

(Continued)

*Primary Examiner* — Daniell L Negron
(74) *Attorney, Agent, or Firm* — Hamilton DeSanctis & Cha

(57) ABSTRACT

Various embodiments of the present invention provide systems and methods for data processing. As an example, a data processing circuit is discussed that includes an inter-track interference determination circuit operable to calculate an inter-track interference from a previous track data set based at least in part on the previous track data set and a current track data set. The previous track data set includes a gap. A portion of the data in the previous track data set corresponds to a previous track on a storage medium, and the data in the previous track data set corresponding to the gap corresponds to a track preceding a previous track.

20 Claims, 17 Drawing Sheets

(56) References Cited

U.S. PATENT DOCUMENTS

| | | |
|---|---|---|
| 5,712,861 A | 1/1998 | Inoue et al. |
| 5,717,706 A | 2/1998 | Ikeda |
| 5,768,044 A | 6/1998 | Hetzler |
| 5,802,118 A | 9/1998 | Bliss et al. |
| 5,844,945 A | 12/1998 | Nam et al. |
| 5,898,710 A | 4/1999 | Amrany |
| 5,917,855 A | 6/1999 | Kim |
| 5,923,713 A | 7/1999 | Hatakeyama |
| 5,978,414 A | 11/1999 | Nara |
| 5,983,383 A | 11/1999 | Wolf |
| 6,005,897 A | 12/1999 | McCallister et al. |
| 6,023,783 A | 2/2000 | Divsalar et al. |
| 6,029,264 A | 2/2000 | Kobayashi et al. |
| 6,041,432 A | 3/2000 | Ikeda |
| 6,065,149 A | 5/2000 | Yamanaka |
| 6,097,764 A | 8/2000 | McCallister et al. |
| 6,145,110 A | 11/2000 | Khayrallah |
| 6,216,249 B1 | 4/2001 | Bliss et al. |
| 6,216,251 B1 | 4/2001 | McGinn |
| 6,229,467 B1 | 5/2001 | Eklund et al. |
| 6,266,795 B1 | 7/2001 | Wei |
| 6,317,472 B1 | 11/2001 | Choi et al. |
| 6,351,832 B1 | 2/2002 | Wei |
| 6,377,610 B1 | 4/2002 | Hagenauer et al. |
| 6,381,726 B1 | 4/2002 | Weng |
| 6,438,717 B1 | 8/2002 | Butler et al. |
| 6,473,878 B1 | 10/2002 | Wei |
| 6,476,989 B1 | 11/2002 | Chainer et al. |
| 6,625,775 B1 | 9/2003 | Kim |
| 6,657,803 B1 | 12/2003 | Ling et al. |
| 6,671,404 B1 | 12/2003 | Katawani et al. |
| 6,735,028 B1 | 5/2004 | Rothschild |
| 6,748,034 B2 | 6/2004 | Hattori et al. |
| 6,757,862 B1 | 6/2004 | Marianetti, II |
| 6,785,863 B2 | 8/2004 | Blankenship et al. |
| 6,788,654 B1 | 9/2004 | Hashimoto et al. |
| 6,810,502 B2 | 10/2004 | Eidson |
| 6,980,382 B2 | 12/2005 | Hirano et al. |
| 6,986,098 B2 | 1/2006 | Poeppelman |
| 7,002,762 B2 | 2/2006 | Mayergoyz |
| 7,010,051 B2 | 3/2006 | Murayama et al. |
| 7,047,474 B2 | 5/2006 | Rhee et al. |
| 7,058,873 B2 | 6/2006 | Song et al. |
| 7,068,459 B1 | 6/2006 | Cloke |
| 7,073,118 B2 | 7/2006 | Greenberg et al. |
| 7,093,179 B2 | 8/2006 | Shea |
| 7,113,356 B1 | 9/2006 | Wu |
| 7,136,244 B1 | 11/2006 | Rothbert |
| 7,173,783 B1 | 2/2007 | McEwen et al. |
| 7,184,486 B1 | 2/2007 | Wu et al. |
| 7,191,378 B2 | 3/2007 | Eroz et al. |
| 7,203,015 B2 | 4/2007 | Sakai et al. |
| 7,203,887 B2 | 4/2007 | Eroz et al. |
| 7,236,757 B2 | 6/2007 | Raghaven et al. |
| 7,253,986 B2 | 8/2007 | Berman |
| 7,257,764 B2 | 8/2007 | Suzuki et al. |
| 7,310,768 B2 | 12/2007 | Eidson et al. |
| 7,313,750 B1 | 12/2007 | Feng et al. |
| 7,370,258 B2 | 5/2008 | Iancu et al. |
| 7,403,752 B2 | 7/2008 | Raghaven et al. |
| 7,428,120 B2 | 9/2008 | Berman |
| 7,430,256 B2 | 9/2008 | Zhidkov |
| 7,502,189 B2 | 3/2009 | Sawaguchi et al. |
| 7,505,537 B1 | 3/2009 | Sutardja |
| 7,523,375 B2 | 4/2009 | Spencer |
| 7,587,657 B2 | 9/2009 | Haratsch |
| 7,589,372 B2 | 9/2009 | Shin |
| 7,590,168 B2 | 9/2009 | Raghaven et al. |
| 7,702,989 B2 | 4/2010 | Graef et al. |
| 7,712,008 B2 | 5/2010 | Song et al. |
| 7,738,201 B2 | 6/2010 | Jin et al. |
| 7,752,523 B1 | 7/2010 | Chaichanavong |
| 7,801,200 B2 | 9/2010 | Tan |
| 7,801,253 B1 | 9/2010 | Wu |
| 7,802,163 B2 | 9/2010 | Tan |
| 8,169,730 B2 | 5/2012 | Cheng |
| 8,259,872 B2 | 9/2012 | Wu |
| 2003/0063405 A1 | 4/2003 | Jin et al. |
| 2003/0081693 A1 | 5/2003 | Raghavan et al. |
| 2003/0087634 A1 | 5/2003 | Raghavan et al. |
| 2003/0112896 A1 | 6/2003 | Raghavan et al. |
| 2003/0134607 A1 | 7/2003 | Raghavan et al. |
| 2004/0071206 A1 | 4/2004 | Takatsu |
| 2004/0098659 A1 | 5/2004 | Bjerke et al. |
| 2005/0010855 A1 | 1/2005 | Lusky |
| 2005/0078399 A1 | 4/2005 | Fung |
| 2005/0111540 A1 | 5/2005 | Modrie et al. |
| 2005/0157780 A1 | 7/2005 | Werner et al. |
| 2005/0180039 A1 | 8/2005 | Mayergoyz et al. |
| 2005/0195749 A1 | 9/2005 | Elmasry et al. |
| 2005/0216819 A1 | 9/2005 | Chugg et al. |
| 2005/0273688 A1 | 12/2005 | Argon |
| 2006/0020872 A1 | 1/2006 | Richardson et al. |
| 2006/0031737 A1 | 2/2006 | Chugg et al. |
| 2006/0123285 A1 | 6/2006 | De Araujo et al. |
| 2006/0140311 A1 | 6/2006 | Ashley et al. |
| 2006/0168493 A1 | 7/2006 | Song |
| 2006/0181975 A1 | 8/2006 | Padiy |
| 2006/0195772 A1 | 8/2006 | Graef et al. |
| 2006/0210002 A1 | 9/2006 | Yang et al. |
| 2006/0248435 A1 | 11/2006 | Haratsch |
| 2006/0256670 A1 | 11/2006 | Park et al. |
| 2007/0011569 A1 | 1/2007 | Vila Casado et al. |
| 2007/0047121 A1 | 3/2007 | Elefeheriou et al. |
| 2007/0047635 A1 | 3/2007 | Stojanovic et al. |
| 2007/0110200 A1 | 5/2007 | Mergen et al. |
| 2007/0230407 A1 | 10/2007 | Petrie et al. |
| 2007/0286270 A1 | 12/2007 | Huang et al. |
| 2008/0049825 A1 | 2/2008 | Chen et al. |
| 2008/0055122 A1 | 3/2008 | Tan |
| 2008/0065970 A1 | 3/2008 | Tan |
| 2008/0069373 A1 | 3/2008 | Jiang et al. |
| 2008/0151704 A1* | 6/2008 | Harada ............... 369/30.22 |
| 2008/0168330 A1 | 7/2008 | Graef et al. |
| 2008/0276156 A1 | 11/2008 | Gunnam |
| 2008/0301521 A1 | 12/2008 | Gunnam |
| 2009/0185643 A1 | 7/2009 | Fitzpatrick |
| 2009/0199071 A1 | 8/2009 | Graef |
| 2009/0235116 A1 | 9/2009 | Tan et al. |
| 2009/0235146 A1 | 9/2009 | Tan |
| 2009/0259915 A1 | 10/2009 | Livshitz et al. |
| 2009/0273492 A1 | 11/2009 | Yang et al. |
| 2009/0274247 A1 | 11/2009 | Galbraith et al. |
| 2010/0002795 A1 | 1/2010 | Raghavan et al. |
| 2010/0042877 A1 | 2/2010 | Tan |
| 2010/0042890 A1 | 2/2010 | Gunam |
| 2010/0050043 A1 | 2/2010 | Valentin Savin |
| 2010/0061492 A1 | 3/2010 | Noeldner |
| 2010/0070837 A1 | 3/2010 | Xu et al. |
| 2010/0164764 A1 | 7/2010 | Nayak |
| 2010/0185914 A1 | 7/2010 | Tan et al. |
| 2011/0075569 A1 | 3/2011 | Marrow et al. |
| 2011/0080211 A1 | 4/2011 | Yang et al. |
| 2011/0167246 A1 | 7/2011 | Yang et al. |

FOREIGN PATENT DOCUMENTS

| | | |
|---|---|---|
| EP | 1814108 | 8/2007 |
| WO | WO 2006/016751 | 2/2006 |
| WO | WO 2006/134527 | 12/2006 |
| WO | WO 2007/091797 | 8/2007 |
| WO | WO 2010/126482 | 4/2010 |
| WO | WO 2010/101578 | 9/2010 |

OTHER PUBLICATIONS

U.S. Appl. No. 13/186,174, filed Jul. 19, 2011, Mathew, George et al.
U.S. Appl. No. 13/186,146, filed Jul. 19, 2011, Mathew, George et al.
U.S. Appl. No. 11/461,026, filed Jul. 31, 2006, Tan, Weijun.
U.S. Appl. No. 11/461,198, filed Jul. 31, 2006, Tan, Weijun.
U.S. Appl. No. 11/461,283, filed Jul. 31, 2006, Tan, Weijun.
U.S. Appl. No. 12/540,283, filed Aug. 12, 2009, Liu, et al.
U.S. Appl. No. 12/652,201, filed Jan. 5, 2010, Mathew, et al.
U.S. Appl. No. 12/763,050, filed Apr. 19, 2010, Ivkovic, et al.

(56) References Cited

OTHER PUBLICATIONS

U.S. Appl. No. 12/792,555, filed Jun. 2, 2010, Liu, et al.
U.S. Appl. No. 12/887,317, filed Sep. 21, 2010, Xia, et al.
U.S. Appl. No. 12/887,330, filed Sep. 21, 2010, Zhang, et al.
U.S. Appl. No. 12/887,369, filed Sep. 21, 2010, Liu, et al.
U.S. Appl. No. 12/901,816, filed Oct. 11, 2010, Li, et al.
U.S. Appl. No. 12/901,742, filed Oct. 11, 2010, Yang.
U.S. Appl. No. 12/917,756, filed Nov. 2, 2010, Miladinovic, et al.
U.S. Appl. No. 12/947,931, filed Nov. 17, 2010, Yang, Shaohua.
U.S. Appl. No. 12/947,947, filed Nov. 17, 2010, Ivkovic, et al.
U.S. Appl. No. 12/972,942, filed Dec. 20, 2010, Liao, et al.
U.S. Appl. No. 12/992,948, filed Nov. 16, 2010, Yang, et al.
U.S. Appl. No. 13/021,814, filed Feb. 7, 2011, Jin, Ming, et al.
U.S. Appl. No. 13/031,818, filed Feb. 22, 2011, Xu, Changyou, et al.
U.S. Appl. No. 13/050,129, filed Mar. 17, 2011, Tan, et al.
U.S. Appl. No. 13/050,765, filed Mar. 17, 2011, Yang, et al.
U.S. Appl. No. 13/088,119, filed Apr. 15, 2011, Zhang, et al.
U.S. Appl. No. 13/088,146, filed Apr. 15, 2011, Li, et al.
U.S. Appl. No. 13/088,178, filed Apr. 15, 2011, Sun, et al.
U.S. Appl. No. 13/126,748, filed Apr. 28, 2011, Tan.
U.S. Appl. No. 13/167,764, filed Jun. 24, 2011, Li, Zongwang, et al.
U.S. Appl. No. 13/167,771, filed Jun. 24, 2011, Li, Zongwang, et al.
U.S. Appl. No. 13/167,775, filed Jun. 24, 2011, Li, Zongwang.
U.S. Appl. No. 13/186,146, filed Jul. 19, 2011, Mathew, et al.
U.S. Appl. No. 13/186,213, filed Jul. 19, 2011, Mathew, et al.
U.S. Appl. No. 13/186,234, filed Jul. 19, 2011, Xia, Haitao, et al.
U.S. Appl. No. 13/186,251, filed Jul. 19, 2011, Xia, Haitao, et al.
U.S. Appl. No. 13/186,174, filed Jul. 19, 2011, Mathew, et al.
U.S. Appl. No. 13/186,197, filed Jul. 19, 2011, Mathew, George et al.
U.S. Appl. No. 13/213,751, filed Aug. 19, 2011, Zhang, Fan, et al.
U.S. Appl. No. 13/213,808, filed Aug. 19, 2011, Jin, Ming.
U.S. Appl. No. 13/220,142, filed Aug. 29, 2011, Chang, Wu, et al.
U.S. Appl. No. 13/227,538, filed Sep. 8, 2011, Yang, Shaohua, et al.
U.S. Appl. No. 13/227,544, filed Sep. 8, 2011, Yang, Shaohua, et al.
U.S. Appl. No. 13/239,683, filed Sep. 22, 2011, Xu, Changyou.
U.S. Appl. No. 13/239,719, filed Sep. 22, 2011, Xia, Haitao, et al.
U.S. Appl. No. 13/251,342, filed Oct. 2, 2011, Xia, Haitao, et al.
U.S. Appl. No. 13/269,832, filed Oct. 10, 2011, Xia, Haitao, et al.
U.S. Appl. No. 13/269,852, filed Oct. 10, 2011, Xia, Haitao, et al.
U.S. Appl. No. 13/284,819, filed Oct. 28, 2011, Tan, Weijun, et al.
U.S. Appl. No. 13/284,730, filed Oct. 28, 2011, Zhang, Fan, et al.
U.S. Appl. No. 13/284,754, filed Oct. 28, 2011, Zhang, Fan, et al.
U.S. Appl. No. 13/284,767, filed Oct. 28, 2011, Zhang, Fan, et al.
U.S. Appl. No. 13/284,826, filed Oct. 28, 2011, Tan, Weijun, et al.
U.S. Appl. No. 13/295,150, filed Nov. 14, 2011, Li, Zongwang, et al.
U.S. Appl. No. 13/295,160, filed Nov. 14, 2011, Li, Zongwang, et al.
U.S. Appl. No. 13/251,340, filed Oct. 3, 2011, Xia, Haitao, et al.
Amer et al "Design Issues for a Shingled Write Disk System" MSST IEEE 26th Symposium May 2010.
Bahl, et al "Optimal decoding of linear codes for Minimizing symbol error rate", IEEE Trans. Inform. Theory, vol. 20, pp. 284-287, Mar. 1974.
Casado et al., Multiple-rate low-denstiy parity-check codes with constant blocklength, IEEE Transations on communications, Jan. 2009, vol. 57, pp. 75-83.
Collins and Hizlan, "Determinate State Convolutional Codes" IEEE Transactions on Communications, Dec. 1993.
Eleftheriou, E. et al., "Low Density Parity-Check Codes for Digital Subscriber Lines", Proc ICC 2002, pp. 1752-1757.
Fisher, R et al., "Adaptive Thresholding"[online] 2003 [retrieved on May 28, 2010] Retrieved from the Internet <URL:http://homepages.inf.ed.ac.uk/rbf/HIPR2/adpthrsh.htm.
Fossnorier, Marc P.C. "Quasi-Cyclic Low-Density Parity-Check Codes From Circulant Permutation Maricies" IEEE Transactions on Information Theory, vol. 50, No. 8 Aug. 8, 2004.
Gibson et al "Directions for Shingled-Write and Two-Dimensional Magnetic Recording System" Architectures: Synergies with Solid-State Disks Carnegie Mellon Univ. May 1, 2009.

K. Gunnam et al., "Next Generation iterative LDPC solutions for magnetic recording storage", invited paper. The Asilomar Conference on Signals, Systems, and Computers, Nov. 2008.
K. Gunnam et al., "Value-Reuse Properties of Min-Sum for GF(q)" (dated Oct. 2006) Dept. of ECE, Texas A&M University Technical Note, published about Aug. 2010.
K. Gunnam et al., "Value-Reuse Properties of Min-Sum for GF(q)"(dated Jul. 2008) Dept. of ECE, Texas A&M University Technical Note, published about Aug. 2010.
K. Gunnam "Area and Energy Efficient VLSI Architectures for Low-Density Parity-Check Decoders Using an On-The-Fly Computation" dissertation at Texas A&M University, Dec. 2006.
Han and Ryan, "Pinning Techniques for Low-Floor Detection/Decoding of LDPC-Coded Partial Response Channels", 5th International Symposium on Turbo Codes &Related Topics, 2008.
Hagenauer, J. et al A Viterbi Algorithm with Soft-Decision Outputs and its Applications in Proc. IEEE Globecom, pp. 47. 11-47 Dallas, TX Nov. 1989.
Lee et al., "Partial Zero-Forcing Adaptive MMSE Receiver for DS-CDMA Uplink in Multicell Environments" IEEE Transactions on Vehicular Tech. vol. 51, No. 5, Sep. 2002.
Lin et al "An efficient VLSI Architecture for non binary LDPC decoders"—IEEE Transaction on Circuits and Systems II vol. 57, Issue 1 (Jan. 2010) pp. 51-55.
Mohsenin et al., "Split Row: A Reduced Complexity, High Throughput LDPC Decoder Architecture", pp. 1-6, printed from www.ece.ucdavis.edu on Jul. 9, 2007.
Moon et al, "Pattern-dependent noise prediction in signal-dependent Noise," IEEE JSAC, vol. 19, No. 4 pp. 730-743, Apr. 2001.
Perisa et al "Frequency Offset Estimation Based on Phase Offsets Between Sample Correlations" Dept. of Info. Tech. University of Ulm 2005.
Sari H et al., "Transmission Techniques for Digital Terrestrial TV Broadcasting" IEEE Communications Magazine, IEEE Service Center Ny, NY vol. 33, No. 2 Feb. 1995.
Selvarathinam, A.: "Low Density Parity-Check Decoder Architecture for High Throughput Optical Fiber Channels" IEEE International Conference on Computer Design (ICCD '03) 2003.
Shu Lin, Ryan, "Channel Codes, Classical and Modern" 2009, Cambridge University Press, pp. 213-222.
Unknown, "Auto threshold and Auto Local Threshold" [online] [retrieved May 28, 2010] Retrieved from the Internet: <URL:http://www.dentristy.bham.ac.uk/landinig/software/autoth.
Vasic, B., "High-Rate Low-Density Parity-Check Codes Based on Anti-Pasch Affine Geometries," Proc ICC 2002, pp. 1332-1336.
Vasic, B., "High-Rate Girth-Eight Codes on Rectangular Integer Lattices", IEEE Trans. Communications, vol. 52, Aug. 2004, pp. 1248-1252.
Wang Y et al., "A Soft Decision Decoding Scheme for Wireless COFDM With Application to DVB-T" IEEE Trans. on Consumer elec., IEEE Service Center, NY,NY vo. 50, No. 1 Feb. 2004.
Weon-Cheol Lee et al., "Vitierbi Decoding Method Using Channel State Info. in COFDM System" IEEE Trans. on Consumer Elect., IEEE Service Center, NY, NY vol. 45, No. 3 Aug. 1999.
Xia et al, "A Chase-GMD algorithm of Reed-Solomon codes on perpendicular channels", IEEE Transactions on Magnetics, vol. 42 pp. 2603-2605, Oct. 2006.
Xia et al, "Reliability-based Reed-Solomon decoding for magnetic recording channels", IEEE International Conference on Communication pp. 1977-1981, May 2008.
Yeo et al., "VLSI Architecture for Iterative Decoders in Magnetic Storage Channels", Mar. 2001, pp. 748-755, IEEE trans. Magnetics, vol. 37, No. 2.
Youn, et al. "BER Perform. Due to Irrreg. of Row-Weight Distrib. of the Parity-Chk. Matrix in Irreg. LDPC Codes for 10-Gb/s Opt. Signls" Jrnl of Lightwave Tech., vol. 23, Sep. 2005.
Zhong et al., "Area-Efficient Min-Sum Decoder VLSI Architecture for High-Rate QC-LDPC Codes in Magnetic Recording", pp. 1-15, Submitted 2006, not yet published.

(56) References Cited

OTHER PUBLICATIONS

Zhong, "Block-LDPC: A Practical LDPC Coding System Design Approach", IEEE Trans. on Circuits, Regular Papers, vol. 5, No. 4, pp. 766-775, Apr. 2005.

Zhong et al., "Design of VLSI Implementation-Oriented LDPC Codes", IEEE, pp. 670-673, 2003.

Zhong et al., "High-Rate Quasi-Cyclic LDPC Codes for Magnetic Recording Channel with Low Error Floor", ISCAS, IEEE pp. 3546-3549, May 2006.

Zhong et al., "Iterative MAX-LOG-MAP and LDPC Detector/Decoder Hardware Implementation for Magnetic Read Channel", SRC TECHRON, pp. 1-4, Oct. 2005.

Zhong et al., "Joint Code-Encoder Design for LDPC Coding System VLSI Implementation", ISCAS, IEEE pp. 389-392, May 2004.

Zhong et al., "Quasi Cyclic LDPC Codes for the Magnetic Recording Channel: Code Design and VSLI Implementation", IEEE Transactions on Magnetics, v. 43, pp. 1118-1123, Mar. 7.

Zhong, "VLSI Architecture of LDPC Based Signal Detection and Coding System for Magnetic Recording Channel", Thesis, RPI, Troy, NY, pp. 1-95, May 2006.

\* cited by examiner

SYSTEMS AND METHODS FOR HANDLING SECTOR GAPS IN INTER-TRACK INTERFERENCE COMPENSATION

CROSS REFERENCE TO RELATED APPLICATIONS

The present application claims priority to (is a non-provisional of) U.S. Pat. App. No. 61/453,676, entitled "Systems and Methods for Track to Track Interference Compensation", and filed Mar. 17, 2011 by Mathew et al.; U.S. Pat. App. No. 61/453,680, entitled "Systems and Methods for Handling Sector Gaps in Inter-track Interference Compensation", and filed Mar. 17, 2011 by Mathew et al.; U.S. Pat. App. No. 61/382,117, entitled "Estimation and Cancellation of ITI in SMR", and filed Sep. 10, 2010 by Mathew et al. The entirety of the aforementioned provisional patent application is incorporated herein by reference for all purposes.

BACKGROUND OF THE INVENTION

The present inventions are related to systems and methods for data processing, and more particularly to systems and methods for processing data retrieved from a storage medium.

Data storage systems often store data arranged in tracks. FIG. 1a shows a storage medium 101 with two exemplary tracks 151, 156 indicated as dashed lines. The tracks are segregated by servo data written within wedges 161, 166 (i.e., servo wedges). These wedges include data and supporting bit patterns 111 that are used for control and synchronization of the read/write head assembly over a desired location on storage medium 101. In particular, these wedges generally include a preamble pattern 192 followed by a sector address mark 194 (SAM). Sector address mark 194 is followed by a Gray code 196, and Gray code 196 is followed by burst information 198. It should be noted that while two tracks and two wedges are shown, hundreds of each would typically be included on a given storage medium. User data is stored at bit period locations between successive servo wedges.

FIG. 1b shows an existing track to track layout 100 of data on a storage medium. Of note, track to track layout 100 includes only some of the data across some of the tracks that would be expected on an existing storage medium. As shown, layout 100 includes a number of tracks 105, 110, 115, 120, 125. Each of the tracks includes a synchronization pattern 150 (i.e., sync data 1, sync data 2, sync data 3, sync data 4, sync data 5) followed by bit periods of user data 155, 160, 165, 170, 175, 180, 185, 190. The bit periods each include magnetic information corresponding to data for a given bit period. As the density of the bit periods increase, magnetic information from one bit period will interfere or be combined with magnetic information from surrounding bit periods. This includes interaction from bit periods in one track with bit periods in prior and subsequent tracks. Failure to properly account for inter-track interference results in diminished accuracy of read back data.

Hence, for at least the aforementioned reasons, there exists a need in the art for advanced systems and methods for inter-track interference compensation.

BRIEF SUMMARY OF THE INVENTION

The present inventions are related to systems and methods for data processing, and more particularly to systems and methods for processing data retrieved from a storage medium.

Various embodiments of the present invention provide non-zero gap, inter-track interference compensation circuits. Such circuits include an inter-track interference determination circuit operable to calculate an inter-track interference from a previous track data set based at least in part on the previous track data set and a current track data set. The previous track data set includes a gap. A portion of the data in the previous track data set corresponds to a previous track on a storage medium, and the data in the previous track data set corresponding to the gap corresponds to a track preceding a previous track. In some instances of the aforementioned embodiments, the circuit further includes a data buffer and a hard data load circuit. The data buffer is operable to store the portion of previous track data set. The hard data load circuit is operable determine a location of the gap and to load the previous track data set into the data buffer. In particular cases, the gap is written with data corresponding to the track preceding the previous track. In some cases, the circuit further includes an inter-track interference cancellation circuit that is operable to cancel the inter-track interference from the previous track data set to yield a compensated output.

In some cases, the gap is an unused area between a sync mark region and a user data region. In one or more cases, at least a portion of the user data region is written with data corresponding to the track preceding the previous track, and is overwritten with data corresponding to the previous track. In various cases, at least a portion of the sync mark region is written with data corresponding to the track preceding the previous track, and is overwritten with data corresponding to the previous track. In one or more cases, at least a portion of the gap is written with data corresponding to the track preceding the previous track, and is not overwritten with data corresponding to the previous track.

In particular cases, the inter-track interference determination circuit includes: an inter-track interference response circuit, and an inter-track interference signal estimator circuit. The inter-track interference response circuit is operable to estimate an inter-track interference response from the previous track data set based at least in part on the previous track data set and a current track data set. The inter-track interference signal estimator circuit operable to calculate an inter-track interference from the previous track data set based at least in part on the previous track data set and the inter-track interference response from the previous track data set.

Other embodiments of the present invention provide methods for cancelling inter-track interference in a non-zero gap data set. Such methods include: receiving a current track data set derived from a current track on a storage medium; accessing a previous track data set that was derived from a previous track on the storage medium, and the previous track data set includes a gap having data that corresponds to a track preceding the previous track on the storage medium; calculating an estimated inter-track interference response from the previous track data set based at least in part on the current track data set and the previous track data set; and calculating an inter-track interference from the previous track data set based at least in part on the previous track data set and the inter-track interference response from the previous track data set. In some cases, the methods further include cancelling the inter-track interference from the previous track data set to yield a compensated output.

In some cases, the gap is an unused area between a sync mark region and a user data region. In some cases, at least a portion of the user data region and at least a portion of the sync mark region are written with data corresponding to the track preceding the previous track, and are overwritten with data corresponding to the previous track, and at least a portion of the gap is written with data corresponding to the track preceding the previous track, and is not overwritten with data corresponding to the previous track.

Yet other embodiments of the present invention provide storage devices. The storage devices include: a storage medium, a read/write head assembly disposed in relation to the storage medium, and a read channel circuit operable to receive an information set from the storage medium via the read/write head assembly. The read channel circuit includes: a front end circuit, a data buffer, a hard data load circuit, and an inter-track interference determination circuit. The front end circuit is operable to convert the information set to a current track data set. The hard data load circuit is operable determine a location of a gap in a data set derived from a previous track and to load a previous track data set into the data buffer. The previous track data set includes data corresponding to the previous track for locations other than the location of the gap and includes data from a track preceding the previous track at the location of the gap. The inter-track interference determination circuit is operable to calculate an inter-track interference from the previous track data set based at least in part on the previous track data set and the current track data set.

In some instances of the aforementioned embodiments, the inter-track interference determination circuit includes: an inter-track interference response circuit and an inter-track interference signal estimator circuit. The inter-track interference response circuit is operable to estimate an inter-track interference response from the previous track data set based at least in part on the previous track data set and a current track data set. The inter-track interference signal estimator circuit is operable to calculate an inter-track interference from the previous track data set based at least in part on the previous track data set and the inter-track interference response from the previous track data set. In various instances of the aforementioned embodiments, the read channel circuit further includes an inter-track interference cancellation circuit operable to cancel the inter-track interference from the previous track data set to yield a compensated output.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for data processing, and more particularly to systems and methods for processing data retrieved from a storage medium.

In a storage system where bit period density has increased to the point that interference from one bit period location to another bit period location occurs, inter-track interference between bit periods in surrounding tracks may be estimated by correlating a read back signal from track being processed with hard data bits (i.e., non-return to zero data bits) from an adjacent track. This process is less complex where the sectors across tracks are radially aligned from one track to the next track, but becomes more complex where such alignment does not exist.

Figure 1A:
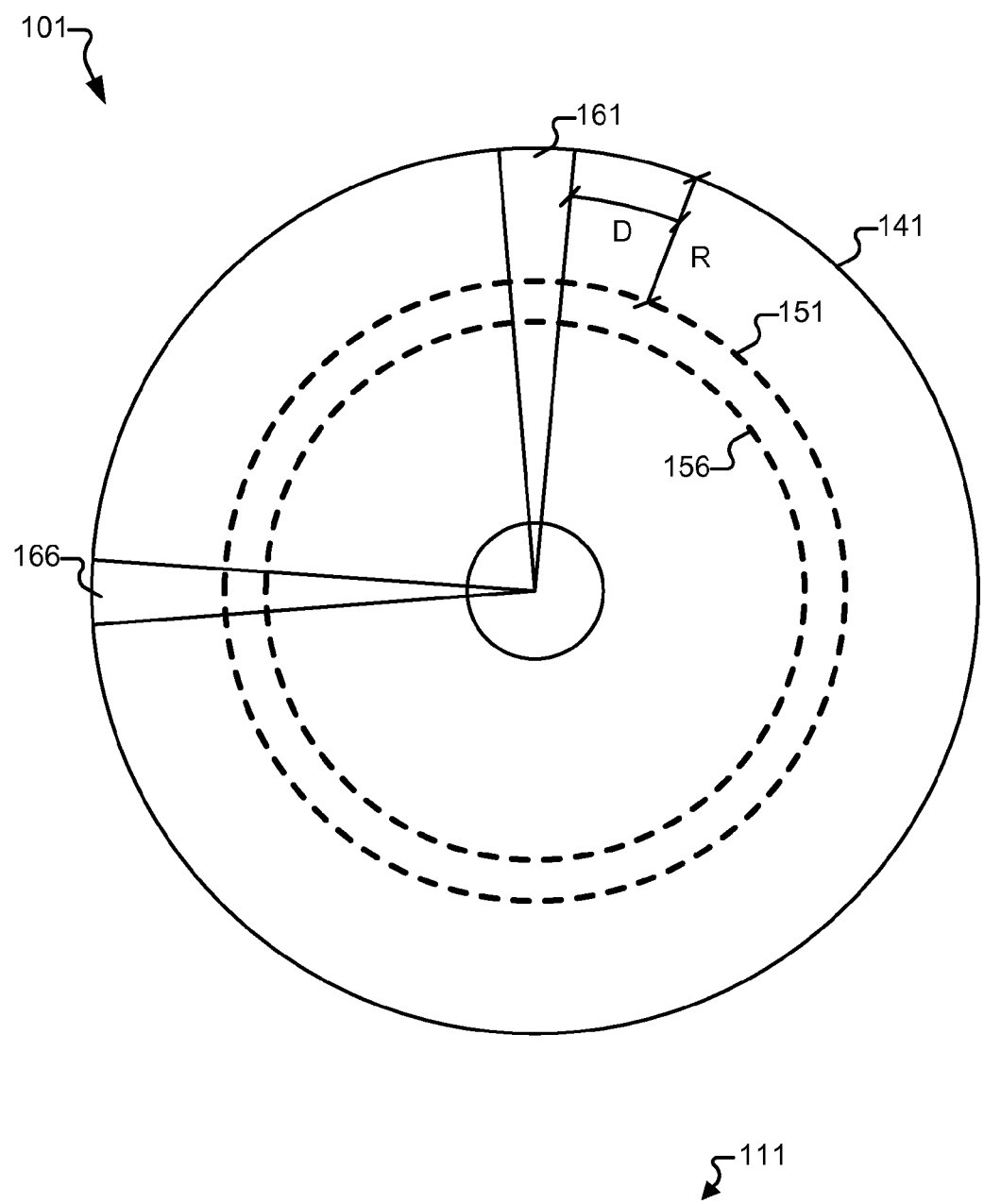
FIG. 1a depicts an existing storage medium including servo data.
Figure 1B:
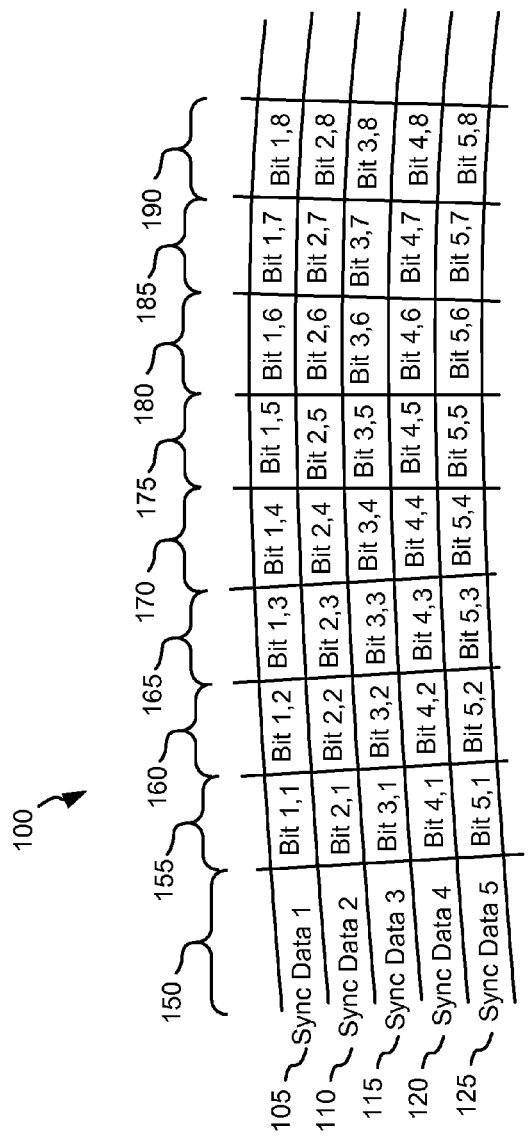
FIG. 1b depicts an existing track to track layout of data on a storage medium.
Figure 2A:
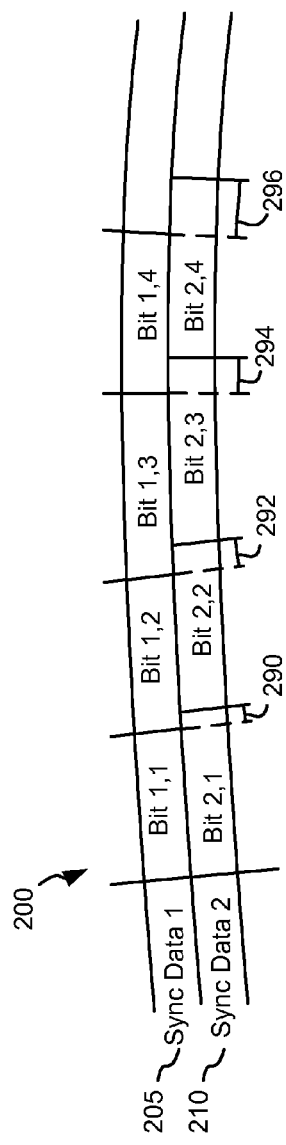
FIGS. 2a-2c depict example track to track layouts that may be operated on in accordance with different embodiments of the present invention.

Various embodiments of the present invention provide for estimating inter-track interference where the radial alignment of bit periods (i.e., data bits) between tracks is undermined due to a non-zero phase offset between tracks and/or sector gaps. Where, for example, radial alignment is offset due to write clock frequency offset between tracks, the radial misalignment increases as traversal in a down-track direction continues (i.e., as the distance between the synchronization data and the particular bit period increases). FIG. 2a depicts a track to track layout 200 where the phase offset between corresponding bit periods in adjacent tracks is non-zero. As shown, two tracks 205, 210 each begin with a respective sync data (i.e., sync data 1 and sync data 2). A first bit period (i.e., bit 1,1) in track 205 begins at the same point as a first bit period (i.e., bit 2,1) in track 210, but ends earlier. In particular, a phase offset 290 exists between the end of bit 1,1 and bit 2,1. The offset between bit periods increases as the distance from the sync data increases. In particular, a phase offset 292 is greater than phase offset 290; a phase offset 294 is greater than phase offset 292; a phase offset 296 is greater than phase offset 294. Such a progressively increasing phase offset typically occurs due to a frequency mismatch between the write clock used to write the user data to track 205 and the write clock used to write the user data to track 210. Of note, it is assumed that the phase offset is approximately zero near the beginning of the user data period as indicated by the sync data.

Because of the non-zero frequency offset between tracks, the actual inter-track interference compensation drifts along a time axis as data is processed from the beginning of a servo wedge to the end of a servo wedge. Consequently, direct correlation of a read back signal from track being processed with hard data from an adjacent track does not yield a correct inter-track interference response if the correlation is performed across an entire wedge (i.e., a user data region extending between successive servo wedges). Some embodiments of the present invention that operate in such a non-zero phase offset environment utilize a block-wise inter-track interference estimation and cancellation to account for the effect of write frequency offset (i.e., the varying phase offset between adjacent tracks).

In one or more embodiments of the present invention, the block-wise inter-track interference estimation and cancellation involves splitting data within a given wedge so that the net phase change across a block of bit periods across adjacent tracks is relatively small compared with a larger block. By maintaining the net phase change small, the use of direct correlation of adjacent bit periods may be used within the sub-block region. In some instances, the block size is on the order of five thousand (5000) bit periods.

Based on the relative shift of the estimated inter-track interference response from one block to another, a shifting strategy can be incorporated into the correlation process to account for the frequency offset. By selecting a block size that is relatively small when compared with, for example, entire tracks or wedges, the overall phase shift within the selected block can be sufficiently small that interpolation and other more expensive methods are not required to account for the varying phase shifts. Block size depends on the frequency offset, larger sub-block sizes can be used where the frequency offset between adjacent tracks is small. In some cases, methods to estimate phase offsets caused by jitter in the write and read (e.g., the assertion of write gates and read gates) may be used in conjunction with the aforementioned processes for inter-track interference estimation and compensation.

Figures 2B, 2C:
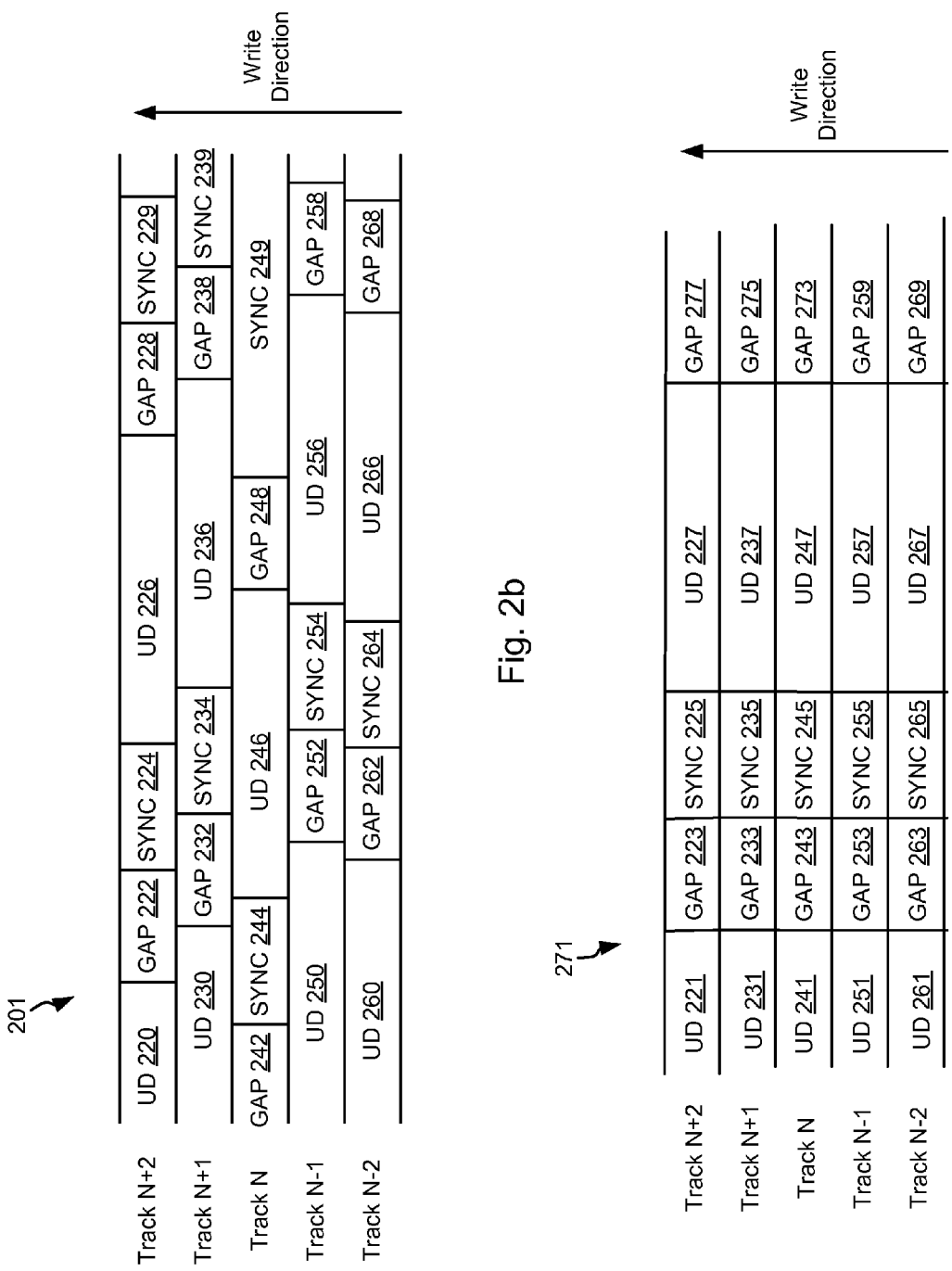

Turning to FIG. 2b, a track to track layout 201 is shown where gaps occur along the tracks. Some embodiments of the present provide processing to accommodate such gaps. Track to track layout 201 includes a number of tracks (Track N−2, Track N−1, Track N, Track N+1 and Track N+2) arranged without radial alignment between the various fields. In particular, Track N−2 of the tracks is the first to be written with Track N+2 being the last to be written. Track N−2 includes a user data region 260, a gap 262, a synchronization data region 264 (e.g., preamble and sync mark fields, a servo wedge, or both), a user data region 266 and a gap 268; track N−1 includes a user data region 250, a gap 252, a synchronization data region 254, a user data region 256 and a gap 258; track N includes a gap 242, a synchronization data region 244, a user data region 246, a gap 248, and a synchronization data region 249; track N+1 includes a user data region 230, a gap 232, a synchronization data region 234, a user data region 236, a gap 238, and a synchronization data region 239; and track N+2 includes a user data region 220, a gap 222, a synchronization data region 224, a user data region 226, a gap 228, and a synchronization data region 229.

Shingled writing (writing over one selected track and an adjacent track, followed by re-writing the region on the adjacent track during a subsequent track write) of the tracks begins by writing track N−2. During this write, magnetic information corresponding to the write of track N−2 is also written to track N−1. When track N−1 is written the previously written magnetic information is overwritten except at the locations of gap 252 and gap 258 where the previously written magnetic information corresponding to track N−2 was written. Similarly, when writing track N−1, the magnetic information corresponding to the write of track N−1 is also written to track N. When track N is written, the previously written magnetic information is overwritten except at the locations of gap 242 and gap 248 where the previously written magnetic information corresponding to track N−1 was written. This process continues until all of the tracks are written. As will be appreciated, most regions of a given track will include inter-track interference predictable based upon the tracks on either side of the track at issue. However, for the gap regions in the adjacent tracks, the inter-track interference will correspond to data that was written two tracks prior (e.g., for Track N, the inter-track interference corresponding to gap 252 and gap 258 will be that written in the corresponding locations in track N−2). Some embodiments of the present invention account for this distant interference.

In some embodiments of the present invention, accounting for such distant inter-track interference is rendered less complex by reading data in the same direction as it was originally written to the storage medium. Such common direction read and write operations is not required in all embodiments of the present invention, but does alleviate the need to buffer considerable data to store and re-order the data when the read is done in the opposite direction of the write. Inter-track interference caused by overlap with sector gaps in some cases is not cancelled as it is constructive in nature to the track to which the current read is directed. Inter-track interference from sector gaps from previous tracks may be canceled using the track preceding the previous track as that data can be made available. Residual inter-track interference from a subsequent track and other un-cancelled inter-track interference that remains after inter-track interference cancellation of interference from preceding tracks can be modeled as stationary zero-mean colored noise which is independent of the data from the track that is being read. In some cases, a read head offset may be optimized to minimize inter-track interference from a subsequent track. In some cases, residual inter-track interference from sector gaps as well as other components behaves like electronics noise, resulting in reducing the percentage of media noise on target track. In such cases, use of an additional noise prediction filter bank operates to reduce the impact of residual inter-track interference.

Some embodiments of the present invention address track-to-track interference related to gaps, by radially aligning any gaps. FIG. 2c depicts a track-to-track layout 271 where the gaps in the respective tracks are radially aligned. Track to track layout 271 includes a number of tracks (Track N−2, Track N−1, Track N, Track N+1 and Track N+2) arranged with radial alignment between corresponding fields or regions of data. In particular, track N−2 of the tracks is the first to be written with track N+2 being the last to be written. Track N−2 includes a user data region 261, a gap 263, a synchronization data region 265 (e.g., preamble and sync-mark fields, a servo wedge, or both), a user data region 267 and a gap 269; track N−1 includes a user data region 251, a gap 253, a synchronization data region 255, a user data region 257 and a gap 259; track N includes a user data region 241, a gap 243, a synchronization data region 245, a user data region 247 and a gap 273; track N+1 includes a user data region 231, a gap 233, a synchronization data region 235 (e.g., a servo wedge), a user data region 237 and a gap 275; and track N+2 includes a user data region 221, a gap 223, a synchronization data region 225, a user data region 227 and a gap 277. By assuring such radial alignment, the inter-track interference occurring in the gaps can be largely ignored, except on the fringes where frequency offset between tracks can result in overlap of a gap and a user data region at the margins.

Figure 3:
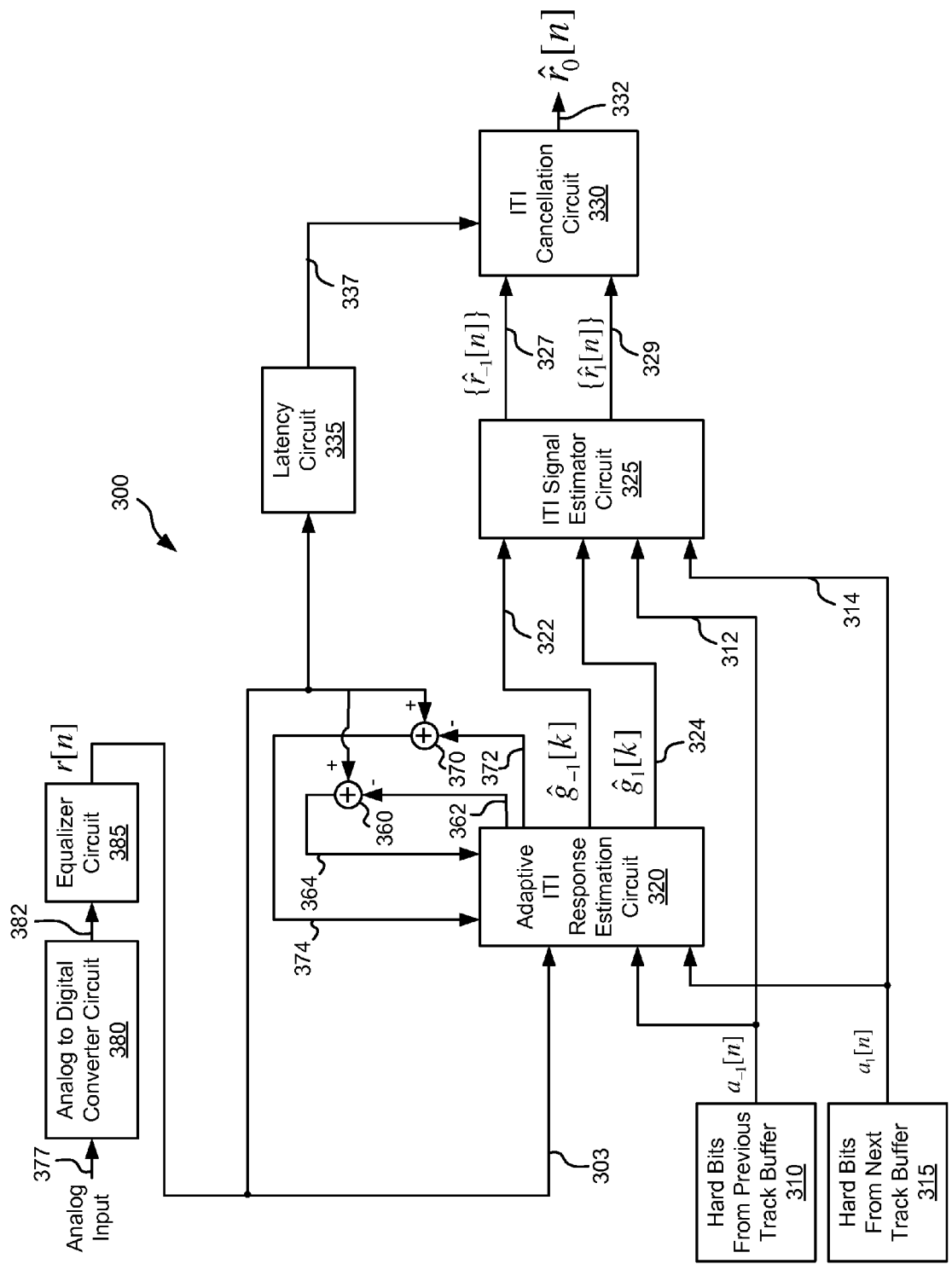
FIG. 3 depicts an inter-track interference compensation circuit in accordance with one or more embodiments of the present invention.

Turning to FIG. 3, an inter-track interference compensation circuit 300 is shown in accordance with one or more embodiments of the present invention. Inter-track interference compensation circuit 300 receives an analog input signal 377. Analog input signal 377 may be derived, for example, from a read/write head assembly (not shown) disposed in relation to a storage medium (not shown), and represents information sensed from the storage medium. Analog input signal 377 is provided to an analog to digital converter circuit 380 that operates to convert the analog signal into a series of digital samples 382 corresponding to analog input signal 377. Analog to digital converter circuit 380 may be any circuit known in the art that is capable of converting an analog signal into corresponding series of digital samples. Based upon the disclosure provided herein, one of ordinary skill in the art will recognize a variety of analog to digital converter circuits and/or architectures that may be used in relation to different embodiments of the present invention. Digital samples 382 are provided to an equalizer circuit 385 that equalizes the digital samples and provides an equalized output 303 (r[n]) to an adaptive inter-track interference response estimation circuit 320. In some embodiments of the present invention, equalizer circuit 385 may be implemented as a digital finite impulse response circuit as are known in the art. Based upon the disclosure provided herein, one of ordinary skill in the art will recognize a variety of equalizer circuits and/or architectures that may be used in relation to different embodiments of the present invention. Where inter-track interference is not a concern (i.e., the tracks are separated by substantial distance), continuous-time version of the equalized output 303 is represented by the following equation:

$$r_0[t] = \Sigma a_0[k] h_0(t-kT),$$

where $a_0[k]$ represents the currently sensed bit period from the storage medium, T denotes the duration of one bit, and $h_0(t)$ represents the inter-symbol interference function (i.e., interference from adjacent symbols along the same track). The inter-track interference corresponding to the two tracks on either side of the current track in equalized output 303 (i.e., an inter-track interference from a previous track $r_{-1}(t)$, and an inter-track interference from a next track $r_1(t)$) may be represented by the following equations, respectively:

$$r_{-1}(t) = \Sigma a_{-1}[k] h_{-1}(t-kT+\tau_{-1})$$

and $$r_1(t) = \Sigma a_1[k] h_1(t-kT+\tau_1),$$

where $h_{-1}(t)$ represents the inter-track interference response from the previous track, $h_1(t)$ represents the inter-track interference response from the next track, $\tau_{-1}$ represents the phase delay of the track being read with respect to the previous track, and $\tau_1$ represents the phase delay of the track being read with respect to the next track. The functions $h_{-1}(.)$ and $h_1(.)$ are interference models based on various criteria including the relative proximity of adjacent tracks. Such models may be developed for a particular storage device or medium. Accounting for the inter-track interference, equalized output 303 (in continuous-time) may be represented by the following equation:

$$r(t) = r_0(t) + r_1(t) + r_{-1}(t).$$

Thus, discrete-time version of the equalized output 303 may be represented by the following equation:

$$r[n] = r(nT) = \Sigma a_0[k] g_0[n-k] + \Sigma a_1[k] g_1[n-k] + \Sigma a_{-1}[k] g_{-1}[n-k],$$

where $g_0[k]=h_0(kT)$, $g_1[k]=h_1(kT+\tau_1)$, and $g_{-1}[k]=h_{-1}(kT+\tau_{-1})$. Assuming $\{a_0[n], a_{-1}[n], a_1[n]\}$ are mutually uncorrelated bit streams, the expected values for the functions $h_{-1}(.)$ and $h_1(.)$ are defined as follows:

$$E[r[n] \cdot a_{-1}[n-n_{-1}]] = g_{-1}[n_{-1}] = h_{-1}(n_{-1}T+\hat{\tau}_{-1});$$

and $$E[r[n] \cdot a_1[n-n_1]] = g_{-1}[n_1] = h_1(n_1T+\hat{\tau}_1),$$

respectively.

Inter-track interference compensation circuit 300 includes a buffer 310 that stores hard data bits retrieved from a previous track (i.e., a track located on a first side of the track being processed), and a buffer 315 that stores hard data bits retrieved from a next track (i.e., a track located on a second side of the track being processed). These hard bits may be stored after a prior processing of data sensed from the respective tracks (i.e., the previous track and the next track). The data from buffer 310 is provided as a data output 312 and is denoted as $a_{-1}[n]$, where n indicates the bit position within the track. The data from buffer 315 is provided as a data output 314 and is denoted as $a_1[n]$, where n indicates the bit position within the track. Data input 312 and data input 314 are provided to adaptive inter-track interference response estimation circuit 320 and an inter-track interference estimator circuit 325.

Latency circuit 335 delays equalized output 303 in time to match the latency involved in calculating inter-track interference responses by inter-track interference estimator circuit 320 and in calculating inter-track interference by inter-track interference estimator circuit 325. The delayed signals are provided as a delayed output 337 to an inter-track interference cancellation circuit 330.

Adaptive inter-track interference response estimation circuit 320 calculates an estimated inter-track interference response from the previous track ($\hat{g}_{-1}[k,n+1]$) and provides it as a previous track interference output 322. Previous track interference response 322 is calculated in accordance with the following equation:

$$\hat{g}_{-1}[k,n+1] = \hat{g}_{-1}[k,n] + \mu_{-1} a_{-1}[n-k] \cdot [r[n] - \tilde{r}_{-1}[n]]),$$

where $\tilde{r}_{-1}[n]$ is the inter-track interference from a previous track provided as an output 362 to a summation circuit 360, and corresponds to the following equation:

$$\tilde{r}_{-1}[n] = \sum_{k=-M_{-1}}^{k=M_{-1}} \hat{g}_{-1}[k,n] a_{-1}[n-k].$$

The value of $[r[n]-\tilde{r}_{-1}[n]]$ is provided as an output 364 from summation circuit 360, and $a_{-1}[n-k]$ is the preceding hard decision from buffer 310. Similarly, adaptive inter-track interference response circuit 320 calculates an estimated inter-track interference response from the next track ($\hat{g}_1[k,n+1]$) and provides it as a next track interference response 324.

$$\hat{g}_1[k,n+1] = \hat{g}_1[k,n] + \mu_1 a_1[n-k] \cdot [r[n] - \tilde{r}_1[n]]),$$

where $\tilde{r}_1[n]$ is the inter-track interference from a next track provided as an output 372 to a summation circuit 370, and corresponds to the following equation:

$$\tilde{r}_1[n] = \sum_{k=-M_1}^{k=M_1} \hat{g}_1[k,n] a_1[n-k].$$

The value of $[r[n]-\tilde{r}_1[n]]$ is provided as an output 374 from summation circuit 370, and $a_1[n-k]$ is the succeeding hard decision from buffer 315. In some cases, the estimated outputs may be estimated using a correlation approach, rather than by direct computation as discussed below in relation to FIG. 5.

Next track interference response 324 and previous track interference response 322 are provided to inter-track interference estimator circuit 325. Inter-track interference estimator circuit 325 estimates the inter-track interference from the previous track ($\{\hat{r}_{-1}[n]\}$) and provides it as a previous track interference output 327. Previous track interference output 327 is estimated (i.e., calculated) in accordance with the following equation:

$$\hat{r}_{-1}[n] = \Sigma a_{-1}[n-k] \hat{g}_{-1}[k],$$

across the bit periods for the track. Similarly, inter-track interference estimator circuit 325 estimates the inter-track interference from the next track ($\{\hat{r}_1[n]\}$) for the bit periods and provides it as a next track interference output 329. Next track interference output 329 is estimated (i.e., calculated) in accordance with the following equation:

$$\hat{r}_1[n] = \Sigma a_1[n-k] \hat{g}_1[k],$$

across the bit periods included in the track.

Next track interference output 329 and previous track interference output 327 are provided to inter-track interference cancellation circuit 330. Inter-track interference cancellation circuit 330 subtracts the inter-track interference signals from the delayed output to yield an inter-track track interference compensated output 332 ($\{\hat{r}_0[n]\}$), across the bit periods included in the track. Inter-track interference compensated output 332 is calculated in accordance with the following equation:

$$\hat{r}_0[n] = r[n] - \hat{r}_1[n] - \hat{r}_{-1}[n],$$

across the bit periods included in the track. It should be noted that while the approach discussed in relation to inter-track interference compensation circuit 300 cancels inter-track interference from both a previous and a next track, the approach may be simplified to cancel inter-track interference from only one of the previous track or the next track. In one case, single sided inter-track interference compensation may be used for real time (e.g., while a storage device is being accessed) operation of the circuit, while double sided inter-track interference compensation may be used for off time (e.g., while an attempt to recover data that was not recoverable in real time is performed) operation of the circuit.

Figure 4:
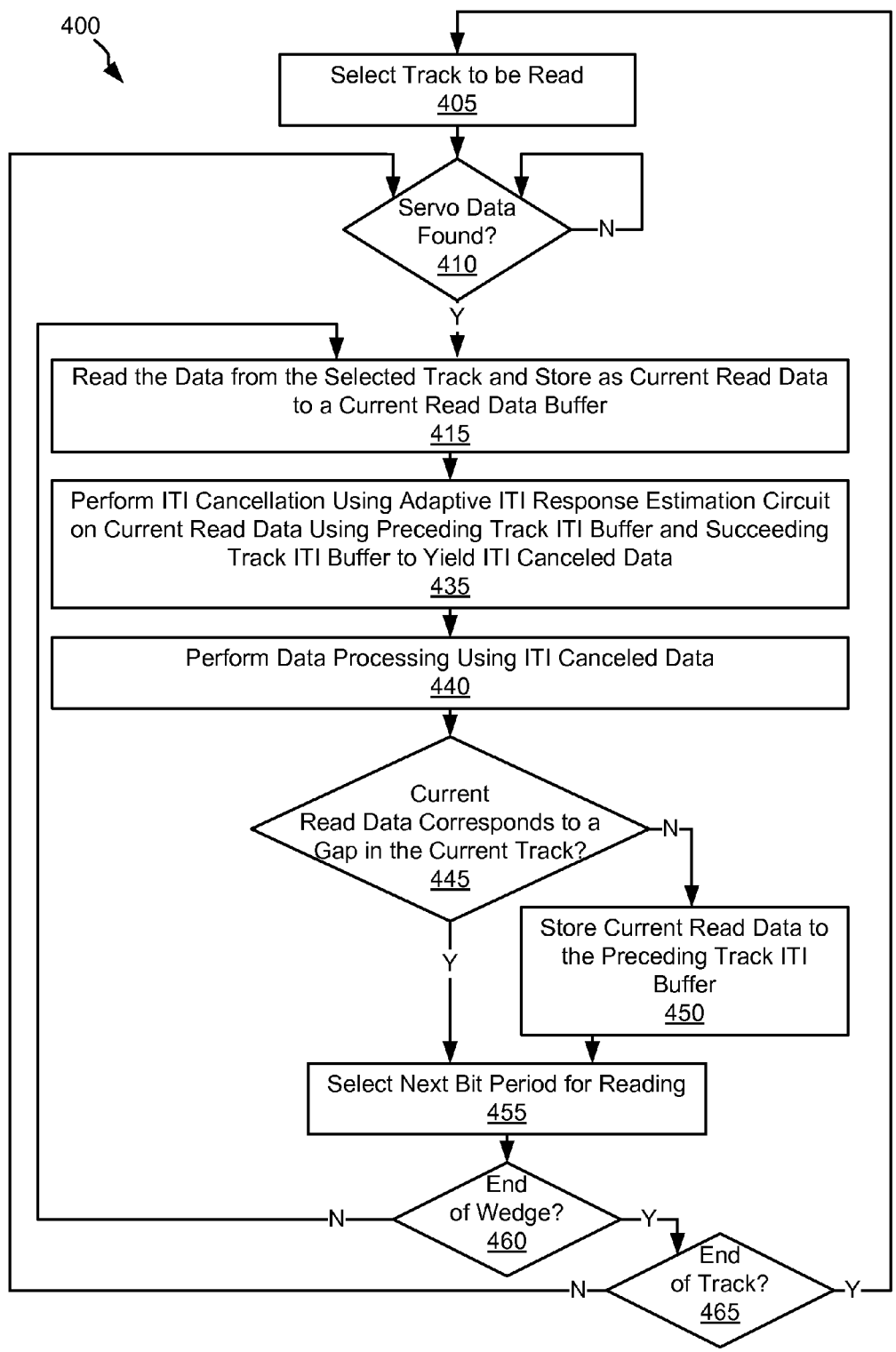
FIG. 4 is a flow diagram showing a method for inter-track interference compensation using an adaptive inter-track interference response estimation circuit in accordance with one or more embodiments of the present invention.

Turning to FIG. 4, a flow diagram 400 shows a method for inter-track interference compensation using an adaptive inter-track interference response estimation circuit in accordance with one or more embodiments of the present invention. Following flow diagram 400, a track to be read is selected (block 405). In cases where both the previous track and the next track are to be considered in cancelling inter-track interference, the hard data (i.e. data bits) corresponding to the next track and the previous track have been loaded into respective inter-track interference buffers. Thus, for example, where track N is selected for reading, a succeeding track inter-track interference buffer holding the hard data corresponding to the track N+1 is loaded, and the data corresponding to track N−1 for the regions of user data region 250, synchronization data 254 and user data region 256, and the data from track N−2 corresponding to gap 252 (i.e., a portion of gap 262 and a subsequent portion of synchronization data 264) and gap 258 (i.e., a portion of gap 268 and a subsequent portion of track N−2) is loaded into a preceding track inter-track interference buffer. It should be noted that the approach discussed in relation to FIG. 4 may be modified to allow for partial inter-track interference cancellation using only one side of the data. In such a case, the hard data corresponding only to the previous track have been loaded into the inter-track interference buffer corresponding to the previous track.

A read/write head assembly is positioned relative to the selected track and it is determined whether the servo wedge data has been identified (block 410). Once the servo wedge data has been found and processed (block 410), data is read from the selected track and stored as current read data to a current read data buffer (bock 415). Inter-track interference cancellation using an adaptive inter-track interference response estimation circuit is performed on the current read data using the preceding track inter-track interference buffer and the succeeding track inter-track interference buffer to yield inter-track interference canceled data (block 435). Such inter-track interference cancellation may be done consistent with that described above in relation to FIG. 3. This inter-track interference canceled data is provided to a downstream data processing circuit to yield hard data corresponding to the selected track (block 440). Such downstream processing may be any processing circuit known in the art. In one particular embodiment of the present invention, the downstream processing may include performing one or more iterations of a combination of a maximum a posteriori data detection process and a low density parity check decoding process. Based on the disclosure provided herein, one of ordinary skill in the art will recognize various processing circuits and approaches that may be used in accordance with different embodiments of the present invention to yield hard data from the inter-track interference canceled data.

As the hard data corresponding to the selected track become available it is determined whether the bits correspond to a gap in the current track (block 445). Thus, using the example of FIG. 2b, it is determined whether the hard data for the current track (e.g., track N) corresponds to gap 242 or gap 248. Where the hard data does not correspond to a gap (block 445), the current read data is stored to the preceding track inter-track interference buffer (block 450). Otherwise, where the hard data correspond to a gap (block 445), the prior value in the preceding track inter-track interference buffer remains as it is not overwritten by the current data. Thus, using the example of FIG. 2b where the current track is track N, data from a portion of user data region 250 of track N–1 corresponding to gap 242 and data from a portion of user data region 256 of track N–1 corresponding to gap 248 remain in the preceding track inter-track interference buffer.

The next bit period is then selected (block 455). It is determined if the end of the wedge (i.e., the region between servo data wedges) has been reached (block 460). Where the end of the wedge has not yet been reached (block 460), the processes of blocks 415-460 is repeated for the next bit period. Alternatively, where the end of the wedge has been reached (block 460), it is determined whether the end of the track has been reached (block 465). Where the end of the track has not yet been reached (block 465), the processes of blocks 410-465 are repeated for the remaining portion of the current track. Otherwise, the next track is selected and the processes of blocks 410-465 are repeated for the next track. By following this approach, the preceding track inter-track interference buffer is prepared for processing the next track when a consecutive track read is followed by including data from a track preceding the preceding track that corresponds to gaps in the preceding track.

Figure 5:
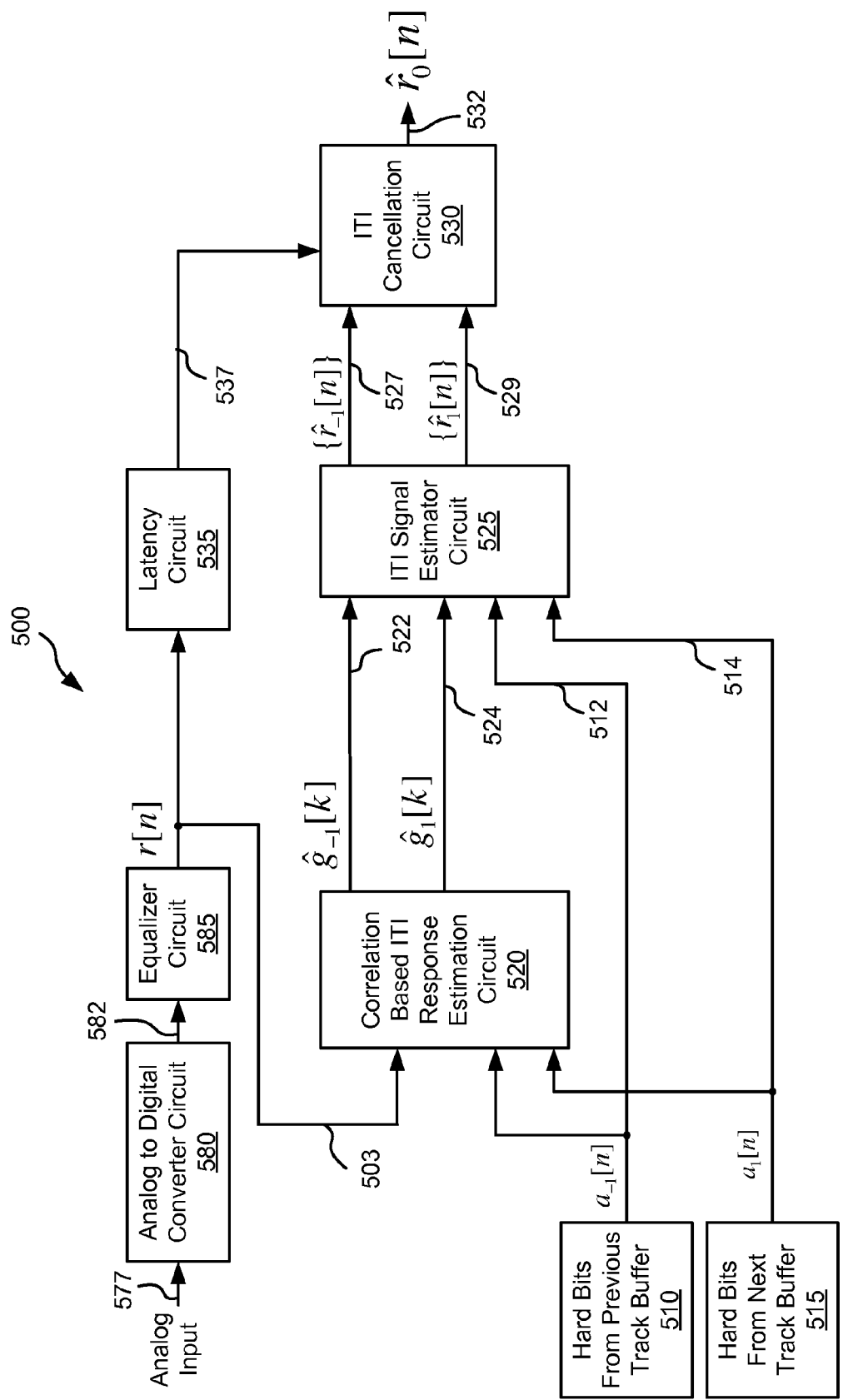
FIG. 5 depicts another inter-track interference compensation circuit in accordance with other embodiments of the present invention.

Turning to FIG. 5, an inter-track interference compensation circuit 500 is shown in accordance with one or more embodiments of the present invention. Inter-track interference compensation circuit 500 receives an analog input signal 577. Analog input signal 577 may be derived, for example, from a read/write head assembly (not shown) disposed in relation to a storage medium (not shown), and represents information sensed from the storage medium. Analog input signal 577 is provided to an analog to digital converter circuit 580 that operates to convert the analog signal into a series of digital samples 582 corresponding to analog input signal 577. Analog to digital converter circuit 580 may be any circuit known in the art that is capable of converting an analog signal into corresponding series of digital samples. Based upon the disclosure provided herein, one of ordinary skill in the art will recognize a variety of analog to digital converter circuits and/or architectures that may be used in relation to different embodiments of the present invention. Digital samples 582 are provided to an equalizer circuit 585 that equalizes the digital samples and provides an equalized output 503 (r[n]) to a correlation based inter-track interference response estimation circuit 520. In some embodiments of the present invention, equalizer circuit 585 may be implemented as a digital finite impulse response circuit as are known in the art. Based upon the disclosure provided herein, one of ordinary skill in the art will recognize a variety of equalizer circuits and/or architectures that may be used in relation to different embodiments of the present invention. Where inter-track interference is not a concern (i.e., the tracks are separated by substantial distance), continuous-time version of the equalized output 503 is represented by the following equation:

$$r_0[t]=\Sigma a_0[k]h_0(t-kT),$$

where $a_0[k]$ represents the currently sensed bit period from the storage medium, T denotes the duration of one bit, and $h_0(t)$ represents the inter-symbol interference function (i.e., interference from adjacent symbols along the same track). The inter-track interference corresponding to the two tracks on either side of the current track in equalized output 503 (i.e., an inter-track interference from a previous track $r_{-1}(t)$, and an inter-track interference from a next track $r_1(t)$) may be represented by the following equations, respectively:

$$r_{-1}(t)=\Sigma a_{-1}[k]h_{-1}(t-kT+\tau_{-1})$$

and $$r_1(t)=\Sigma a_1[k]h_1(t-kT+\tau_1),$$

where $h_{-1}(t)$ represents the inter-track interference response from the previous track, $h_1(t)$ represents the inter-track interference response from the next track, $\tau_{-1}$ represents the phase delay of the track being read with respect to the previous track, and $\tau_1$ represents the phase delay of the track being read with respect to the next track. The functions $h_{-1}(.)$ and $h_1(.)$ are interference models based on various criteria including the relative proximity of adjacent tracks. Such models may be developed for a particular storage device or medium. Accounting for the inter-track interference, equalized output 503 (in continuous-time) may be represented by the following equation:

$$r(t)=r_0(t)+r_1(t)+r_{-1}(t).$$

Thus, discrete-time version of the equalized output 503 may be represented by the following equation:

$$r[n]=r(nT)=\Sigma a_0[k]g_0[n-k]+\Sigma a_1[k]g_1[n-k]+\Sigma a_{-1}[k]g_{-1}[n-k],$$

where $g_0[k]=h_0(kT)$, $g_1[k]=h_1(kT+\tau_1)$, and $g_{-1}[k]=h_{-1}(kT+\tau_{-1})$. Assuming $\{a_0[n], a_{-1}[n], a_1[n]\}$ are mutually uncorrelated bit streams, the expected values for the functions $h_{-1}(.)$ and $h_1(.)$ are defined as follows:

$$E[r[n]\cdot a_{-1}[n-n_{-1}]]=g_{-1}[n_{-1}]=h_{-1}(n_{-1}T+\hat{\tau}_{-1});$$

and $$E[r[n]\cdot a_1[n-n_1]]=g_{-1}[n_1]=h_1(n_1T+\hat{\tau}_1),$$

respectively.

Latency circuit 535 delays equalized output 503 in time to match the latency involved in calculating inter-track interference responses by inter-track interference estimator circuit 520 and in calculating inter-track interference by inter-track interference estimator circuit 525. The delayed signals are provided as a delayed output 537 to an inter-track interference cancellation circuit 530.

Inter-track interference compensation circuit 500 includes a buffer 510 that stores hard data bits retrieved from a previous track (i.e., a track located on a first side of the track being processed), and a buffer 515 that stores hard data bits retrieved from a next track (i.e., a track located on a second side of the track being processed). These hard bits may be stored after a prior processing of data sensed from the respective tracks (i.e., the previous track and the next track). The data from buffer 510 is provided as a data output 512 and is denoted as $a_{-1}[n]$, where n indicates the bit position within the track. The data from buffer 515 is provided as a data output 514 and is denoted as $a_1[n]$, where n indicates the bit position within the track. Data input 512 and data input 514 are provided to correlation based inter-track interference response circuit 520 and an inter-track interference estimator circuit 525.

Correlation based inter-track interference response circuit 520 calculates an estimated inter-track interference response from the previous track ($\hat{g}_{-1}[k]$) and provides it as a previous track interference output 522. Previous track interference response 522 satisfies the following equation:

$$\hat{g}_{-1}[k] = \frac{1}{N_{-1}} \sum_{n=1}^{N_{-1}} a_{-1}[n-k] \cdot r[n],$$

where $N_{-1}$ is the number of data bits available from a previous track, and $a_{-1}[n]$ are corresponding bits from a previous track. Similarly, correlation based inter-track interference response circuit 520 provides an estimated inter-track interference response from the next track ($\hat{g}_1[k]$) that satisfies the following equation:

$$\hat{g}_1[k] = \frac{1}{N_1} \sum_{n=1}^{N_1} a_1[n-k] \cdot r[n],$$

where $N_1$ is the number of data bits available from a next track, and $a_1[n]$ are corresponding bits from a next track.

Next track interference response 524 and previous track interference response 522 are provided to inter-track interference estimator circuit 525. Inter-track interference estimator circuit 525 estimates the inter-track interference from the previous track ($\{\hat{r}_{-1}[n]\}$) for the track and provides it as a previous track interference output 527. Previous track interference output 527 is estimated (i.e., calculated) in accordance with the following equation:

$$\hat{r}_{-1}[n] = \Sigma a_{-1}[n-k]\hat{g}_{-1}[k],$$

across the bit periods for the track. Similarly, inter-track interference estimator circuit 525 estimates the inter-track interference from the next track ($\{\hat{r}_1[n]\}$) for the bit periods and provides it as a next track interference output 529. Next track interference output 529 is estimated (i.e., calculated) in accordance with the following equation:

$$\hat{r}_1[n] = \Sigma a_1[n-k]\hat{g}_1[k],$$

across the bit periods included in the track.

Next track interference output 529 and previous track interference output 527 are provided to inter-track interference cancellation circuit 530. Inter-track interference cancellation circuit 330 subtracts the inter-track interference signals from the delayed output to yield an inter-track interference compensated output 532 ($\{\hat{r}_0[n]\}$), across the bit periods included in the track. Inter-track interference compensated output 532 is calculated in accordance with the following equation:

$$\hat{r}_0[n] = r[n] - \hat{r}_1[n] - \hat{r}_{-1}[n],$$

across the bit periods included in the track. It should be noted that while the approach discussed in relation to inter-track interference compensation circuit 500 cancels inter-track interference from both a previous and a next track, the that approach may be simplified to cancel inter-track interference from only one of the previous track or the next track. In one case, single sided inter-track interference compensation may be used for real time (e.g., while a storage device is being accessed) operation of the circuit, while double sided inter-track interference compensation may be used for off time (e.g., while an attempt to recover data that was not recoverable in real time is performed) operation of the circuit.

Figure 6:
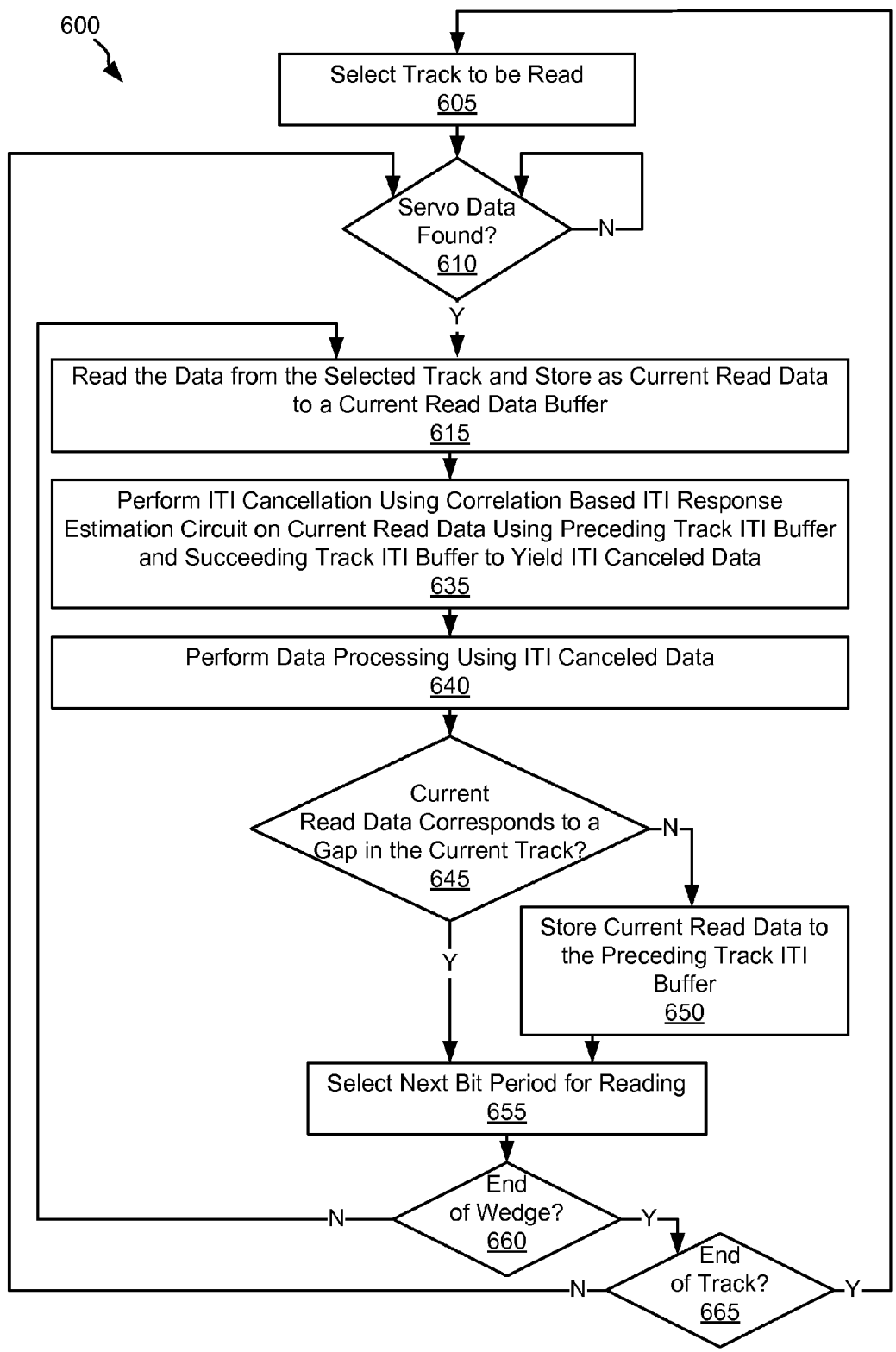
FIG. 6 is a flow diagram showing a method for inter-track interference compensation using a correlation based inter-track interference response estimation circuit in accordance with one or more embodiments of the present invention.

Turning to FIG. 6, a flow diagram 600 shows a method for inter-track interference compensation using a correlation based inter-track interference response estimation circuit in accordance with one or more embodiments of the present invention. Following flow diagram 600, a track to be read is selected (block 605). In cases where both the previous track and the next track are to be considered in cancelling inter-track interference, the hard data corresponding to the next track and the previous track have been loaded into respective inter-track interference buffers. Thus, for example, where track N is selected for reading, a succeeding track inter-track interference buffer holding the hard data corresponding to the track N+1 is loaded, and the data corresponding to track N−1 for the regions of user data region 250, synchronization data 254 and user data region 256, and the data from track N−2 corresponding to gap 252 (i.e., a portion of gap 262 and a subsequent portion of synchronization data 264) and gap 258 (i.e., a portion of gap 268 and a subsequent portion of track N−2) is loaded into a preceding track inter-track interference buffer. It should be noted that the approach discussed in relation to FIG. 6 may be modified to allow for partial inter-track interference cancellation using only one side of the data. In such a case, the hard data corresponding only to the previous track have been loaded into the inter-track interference buffer corresponding to the previous track.

A read/write head assembly is positioned relative to the selected track and it is determined whether the servo wedge data has been identified (block 610). Once the servo wedge data has been found and processed (block 610), data is read from the selected track and stored as current read data to a current read data buffer (bock 615). Inter-track interference cancellation using a correlation based inter-track interference response estimation circuit is performed on the current read data using the preceding track inter-track interference buffer and the succeeding track inter-track interference buffer to yield inter-track interference canceled data (block 635). Such inter-track interference cancellation may be done consistent with that described above in relation to FIG. 5. This inter-track interference canceled data is provided to a downstream data processing circuit to yield hard data corresponding to the selected track (block 640). Such downstream processing may be any processing circuit known in the art. In one particular embodiment of the present invention, the downstream processing may include performing one or more iterations of a combination of a maximum a posteriori data detection process and a low density parity check decoding process. Based on the disclosure provided herein, one of ordinary skill in the art will recognize various processing circuits and approaches that may be used in accordance with different embodiments of the present invention to yield hard data from the inter-track interference canceled data.

As the hard data corresponding to the selected track become available it is determined whether the bits correspond to a gap in the current track (block 645). Thus, using the example of FIG. 2b, it is determined whether the hard data for the current track (e.g., track N) corresponds to gap 242 or gap 248. Where the hard data does not correspond to a gap (block 645), the current read data is stored to the preceding track inter-track interference buffer (block 650). Otherwise, where the hard data correspond to a gap (block 645), the prior value in the preceding track inter-track interference buffer remains as it is not overwritten by the current data. Thus, using the example of FIG. 2b where the current track is track N, data from a portion of user data region 250 of track N−1 corresponding to gap 242 and data from a portion of user data region 256 of track N−1 corresponding to gap 248 remain in the preceding track inter-track interference buffer.

The next bit period is then selected (block 655). It is determined if the end of the wedge (i.e., the region between servo data wedges) has been reached (block 660). Where the end of the wedge has not yet been reached (block 660), the processes of blocks 615-660 is repeated for the next bit period. Alternatively, where the end of the wedge has been reached (block 660), it is determined whether the end of the track has been reached (block 665). Where the end of the track has not yet been reached (block 665), the processes of blocks 610-665 are repeated for the remaining portion of the current track. Otherwise, the next track is selected and the processes of blocks 610-665 are repeated for the next track. By following this approach, the preceding track inter-track interference buffer is prepared for processing the next track when a consecutive track read is followed by including data from a track preceding the preceding track that corresponds to gaps in the preceding track.

Figure 7:
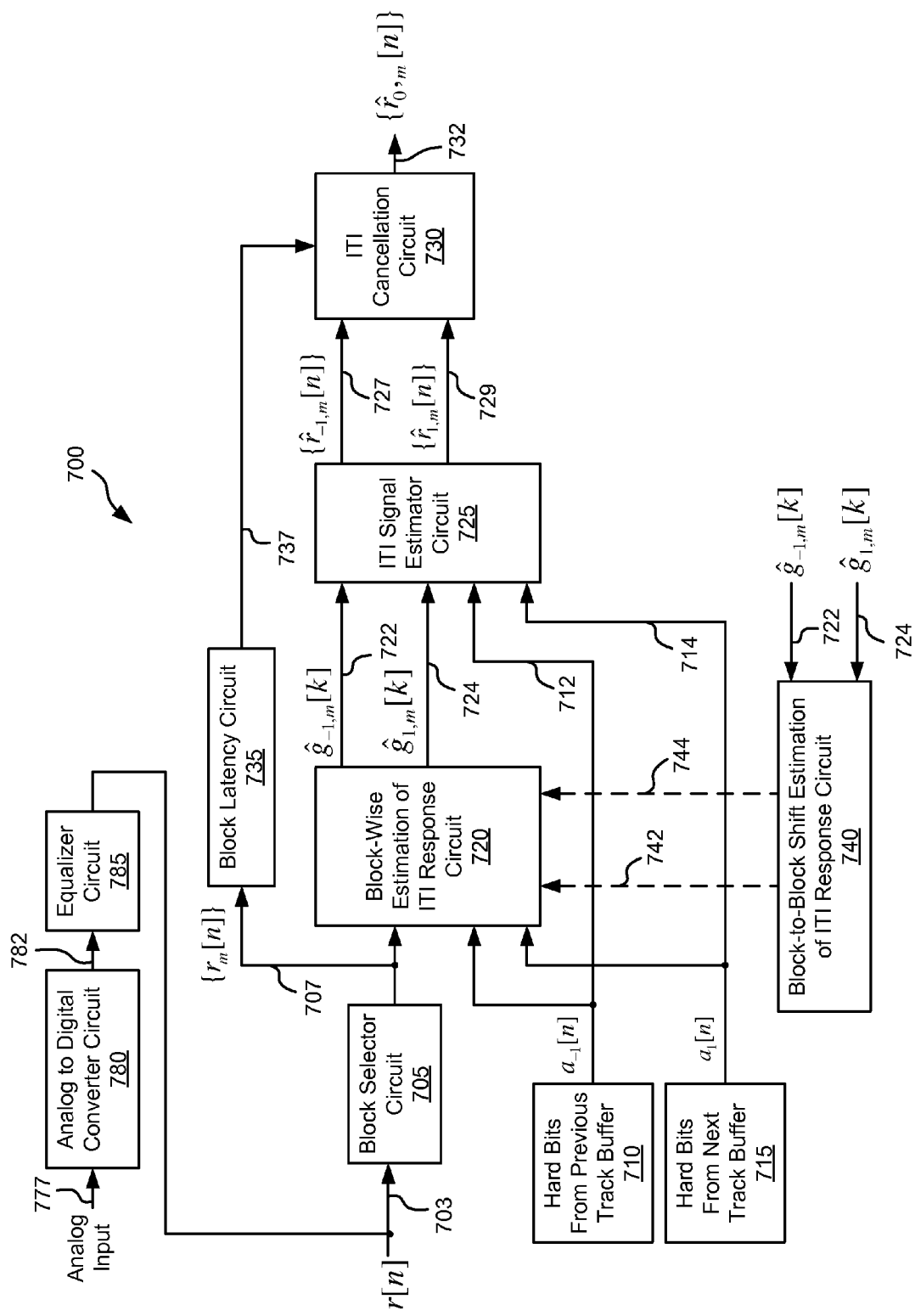
FIG. 7 depicts a non-zero frequency offset inter-track interference compensation circuit in accordance with one or more embodiments of the present invention.

Turning to FIG. 7, a non-zero frequency offset inter-track interference compensation circuit 700 is shown in accordance with one or more embodiments of the present invention. Non-zero frequency offset inter-track interference compensation circuit 700 receives an analog input signal 777. Analog input signal 777 may be derived, for example, from a read/write head assembly (not shown) disposed in relation to a storage medium (not shown), and represents information sensed from the storage medium. Analog input signal 777 is provided to an analog to digital converter circuit 780 that operates to convert the analog signal into a series of digital samples 782 corresponding to analog input signal 777. Analog to digital converter circuit 780 may be any circuit known in the art that is capable of converting an analog signal into corresponding series of digital samples. Based upon the disclosure provided herein, one of ordinary skill in the art will recognize a variety of analog to digital converter circuits and/or architectures that may be used in relation to different embodiments of the present invention. Digital samples 782 are provided to an equalizer circuit 785 that equalizes the digital samples and provides an equalized output 703 (r[n]) to a block selector circuit 705. In some embodiments of the present invention, equalizer circuit 785 may be implemented as a digital finite impulse response circuit as are known in the art. Based upon the disclosure provided herein, one of ordinary skill in the art will recognize a variety of equalizer circuits and/or architectures that may be used in relation to different embodiments of the present invention. Where inter-track interference is not a concern (i.e., the tracks are separated by substantial distance), continuous-time version of the equalized output 703 is represented by the following equation:

$$r_0[t] = \Sigma a_0[k] h_0(t-kT),$$

where $a_0[k]$ represents the currently sensed bit period from the storage medium, T denotes the duration of one bit, and $h_0(t)$ represents the inter-symbol interference function (i.e., interference from adjacent symbols along the same track). The inter-track interference corresponding to the two tracks on either side of the current track in equalized output 703 (i.e., an inter-track interference from a previous track $r_{-1}(t)$, and an inter-track interference from a next track $r_1(t)$) may be represented by the following equations, respectively:

$$r_{-1}(t) = \Sigma a_{-1}[k] h_{-1}(t-kT+\tau_{-1})$$

and $$r_1(t) = \Sigma a_1[k] h_1(t-kT+\tau_1),$$

where $h_{-1}(t)$ represents the inter-track interference response from the previous track, $h_1(t)$ represents the inter-track interference response from the next track, $\tau_{-1}$ represents the phase delay of the track being read with respect to the previous track, and $\tau_1$ represents the phase delay of the track being read with respect to the next track. The functions $h_{-1}(.)$ and $h_1(.)$ are interference models based on various criteria including the relative proximity of adjacent tracks. Such models may be developed for a particular storage device or medium. Accounting for the inter-track interference, equalized output 703 (in continuous-time) may be represented by the following equation:

$$r(t) = r_0(t) + r_1(t) + r_{-1}(t).$$

Thus, discrete-time version of the equalized output 703 may be represented by the following equation:

$$r[n] = r(nT) = \Sigma a_0[k] g_0[n-k] + \Sigma a_1[k] g_1[n-k] + \Sigma a_{-1}[k] g_{-1}[n-k],$$

where $g_0[k] = h_0(kT)$, $g_1[k] = h_1(kT+\tau_1)$, and $g_{-1}[k] = h_{-1}(kT+\tau_{-1})$.

Non-zero frequency offset inter-track interference compensation circuit 700 includes a buffer 710 that stores hard data bits retrieved from a previous track (i.e., a track located on a first side of the track being processed), and a buffer 715 that stores hard data bits retrieved from a next track (i.e., a track located on a second side of the track being processed). These hard bits may be stored after a prior processing of data sensed from the respective tracks (i.e., the previous track and the next track). The data from buffer 710 is provided as a data output 712 and is denoted as $a_{-1}[n]$, where n indicates the bit position within the track. The data from buffer 715 is provided as a data output 714 and is denoted as $a_1[n]$, where n indicated the bit position within the track. Data input 712 and data input 714 are provided to a block-wise estimation of inter-track interference response circuit 720 and an inter-track interference estimator circuit 725.

A block selector circuit 705 identifies a block 707 of bit periods $\{r_m[n]\}$ over which inter-track interference compensation is to be performed, where m indicates the particular block that is selected and n indicates a given bit period along a track within the block. In some cases, the block size may be indicated as a letter i–1. In such cases, the value of n would extend from the first bit period in the selected block to the first bit period plus i. Thus, for example, if the first bit period in the selected block is j, the block would include r[n], $a_1[n]$ and $a_{-1}[n]$ where n extends between j and i+j–1. The size of the block selected may be predetermined and based upon a certain maximum frequency error and/or jitter expected between adjacent tracks, or may be variable and calculated based upon the estimated phase offset across a given number of sequential bit periods. Based upon the disclosure provided herein, one of ordinary skill in the art will recognize a variety of block sizes that may be used in relation to different embodiments of the present invention. Block 707 is provided to block-wise estimation of inter-track interference response circuit 720, and to a block latency circuit 735.

Block latency circuit 735 delays block 707 in time to match the latency involved in calculating inter-track interference responses by block-wise estimation of inter-track interference response circuit 720 and in calculating inter-track interference by inter-track interference estimator circuit 725. The delayed signals are provided as a delayed output 737 to an inter-track interference cancellation circuit 730.

A block-to-block shift estimation of inter-track interference response circuit 740 calculates a phase delay 742 of the track being read with respect to the previous track, and a phase delay 744 of the track being read with respect to the next track. This calculation is done by determining the indices of the maximum tap coefficients in the estimated inter-track interference responses that was used in generating previous track interference output 727 and next track interference output 729. Where the maximum filter tap of the inter-track interference response used in calculating a respective one of previous track interference output 727 is one of the taps to the right of center or the left of center in block-wise estimation of inter-track interference response circuit 720, then phase delay 742 is selected to cause a shift of the maximum tap back toward the center of the filter. Similarly, where the maximum filter tap of the inter-track interference response used in calculating a respective one of next track interference output 729 is one of the taps to the right of center or the left of center in block-wise estimation of inter-track interference response circuit 720, then phase delay 744 is selected to cause a shift of the maximum tap back toward the center of the filter. Phase delay 742 and phase delay 744 are provided along with data output 712, data output 714 and block 707 to block-wise estimation of inter-track interference response circuit 720.

Block-wise estimation of inter-track interference response circuit 720 calculates an estimated inter-track interference response from the previous track ($\hat{g}_{-1,m}[k]$) and provides it as a previous track interference output 722. Previous track interference response 722 satisfies the following equation:

$$\hat{g}_{-1,m}[k] = \frac{1}{N_{-1}} \sum_{n=1}^{N_{-1}} a_{-1}[n+(m-1)N_b-k-\delta_{-1,m}] \cdot r[n+(m-1)N_b]$$

$$\delta_{-1,m} = \delta_{-1,m-1} + k_{-1,m-1}$$

where $\delta_{-1,m}$ denotes the shift in correlator reference required for centering the inter-track interference response from the previous track $\hat{g}_{-1,m}[k]$, $N_b$ denotes the block-size, and $k_{-1,m-1}$ denotes index of the maximum tap coefficient in $\hat{g}_{-1,m-1}[k]$. In some cases, the estimated outputs may be estimated using an adaptive approach, rather than by correlation computation. Similarly, block-wise estimation of inter-track interference response circuit 720 calculates an estimated inter-track interference response from the next track ($\hat{g}_{1,m}[k]$) and provides it as a next track interference response 724. Next track interference response 724 is calculated in accordance with the following equation:

$$\hat{g}_{1,m}[k] = \frac{1}{N_1} \sum_{n=1}^{N_1-1} a_1[n+(m-1)N_b-k-\delta_{1,m}] \cdot r[n+(m-1)N_b]$$

$$\delta_{1,m} = \delta_{1,m-1} + k_{1,m-1}$$

where $\delta_{1,m}$ denotes the shift in correlator reference required for centering the inter-track interference response from the previous track $\hat{g}_{1,m}[k]$ and $k_{1,m-1}$ denotes index of the maximum tap coefficient in $\hat{g}_{1,m-1}[k]$. Starting phase offsets $\delta_{-1,0}$ and $\delta_{1,0}$ are initialized to zero, if sectors are phase synchronized at the beginning and/or if no a priori information on phase offset is available.

Next track interference response 724 and previous track interference response 722 are provided to inter-track interference estimator circuit 725. Inter-track interference estimator circuit 725 estimates the inter-track interference from the previous track ($\{\hat{r}_{-1,m}[n]\}$) for the block m and provides it as a previous track interference output 727. Previous track interference output 727 is estimated (i.e., calculated) in accordance with the following equation:

$$\hat{r}_{-1,m}[n]=\Sigma a_{-1}[n+(m-1)N_b-k-\delta_{-1,m}]\hat{g}_{-1,m}[k],$$

across the bit periods included in the block m. Similarly, inter-track interference estimator circuit 725 estimates the inter-track interference from the next track ($\{\hat{r}_{1,m}[n]\}$) for the block m and provides it as a next track interference output 729. Next track interference output 729 is estimated (i.e., calculated) in accordance with the following equation:

$$\hat{r}_{1,m}[n]=\Sigma a_1[n+(m-1)N_b-k-\delta_{1,m}]\hat{g}_{1,m}[k],$$

across the bit periods included in the block m.

Next track interference output 729 and previous track interference output 727 are provided to inter-track interference cancellation circuit 730 along with delayed output 737. Inter-track interference cancellation circuit 730 subtracts the inter-track interference signals from the delayed output to yield an inter-track interference compensated output 732 ($\{\hat{r}_{0,m}[n]\}$), across the bit periods included in the block m. Inter-track interference compensated output 732 is calculated in accordance with the following equation:

$$\hat{r}_{0,m}[n]=r_m[n]-\hat{r}_{1,m}[n]-\hat{r}_{-1,m}[n],$$

across the bit periods included in the block m.

As just some of many advantages achievable through use of a block-wise inter-track interference estimation and cancellation circuitry: inter-track interference can be compensated using less circuitry than may be required if a digital phase locked loop and interpolation techniques are used to compensate the frequency offset between write clocks on adjacent tracks. Based upon the disclosure provided herein, one of ordinary skill in the art will recognize a variety of other advantages that may be achieved in accordance with various embodiments of the present invention. Also, it should be noted that while the preceding discussion applies inter-track interference processing to the output of an equalizer, such inter-track interference may also be applied to other data outputs. For example, such inter-track interference processing may be applied to the output of the analog to digital converter.

Figure 8:
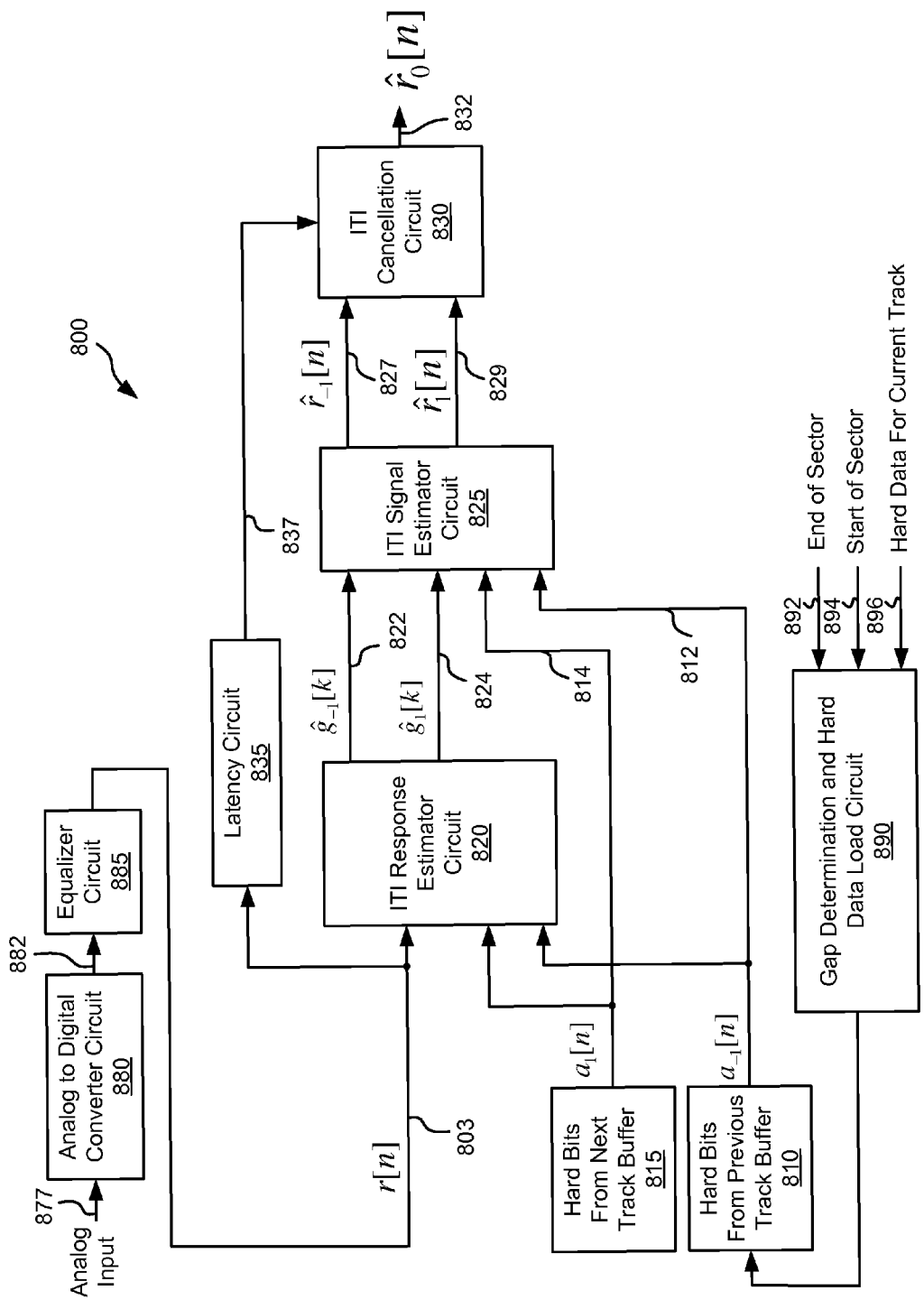
FIG. 8 depicts a gap compensating inter-track interference cancellation circuit in accordance with one or more embodiments of the present invention.

FIG. 8 depicts a gap compensating inter-track interference cancellation circuit 800 in accordance with one or more embodiments of the present invention. Gap compensating inter-track interference cancellation circuit 800 receives an analog input signal 877. Analog input signal 877 may be derived, for example, from a read/write head assembly (not shown) disposed in relation to a storage medium (not shown), and represents information sensed from the storage medium. Analog input signal 877 is provided to an analog to digital converter circuit 880 that operates to convert the analog signal into a series of digital samples 882 corresponding to analog input signal 877. Analog to digital converter circuit 880 may be any circuit known in the art that is capable of converting an analog signal into corresponding series of digital samples. Based upon the disclosure provided herein, one of ordinary skill in the art will recognize a variety of analog to digital converter circuits and/or architectures that may be used in relation to different embodiments of the present invention. Digital samples 882 are provided to an equalizer circuit 885 that equalizes the digital samples and provides an equalized output 803 (r[n]) to an inter-track interference response estimator circuit 820. In some embodiments of the present invention, equalizer circuit 885 may be implemented as a digital finite impulse response circuit as are known in the art. Based upon the disclosure provided herein, one of ordinary skill in the art will recognize a variety of equalizer circuits and/or architectures that may be used in relation to different embodiments of the present invention. Where inter-track interference is not a concern (i.e., the tracks are separated by substantial distance), continuous-time version of the equalized output 803 is represented by the following equation:

$$r_0[t]=\Sigma a_0[k]h_0(t-kT),$$

where $a_0[k]$ represents the currently sensed bit period from the storage medium, T denotes the duration of one bit, and $h_0(t)$ represents the inter-symbol interference function (i.e., interference from adjacent symbols along the same track). The inter-track interference corresponding to the two tracks on either side of the current track in equalized output 803 (i.e., an inter-track interference from a previous track $r_{-1}(t)$, and an inter-track interference from a next track $r_1(t)$) may be represented by the following equations, respectively:

$$r_{-1}(t)=\Sigma a_{-1}[k]h_{-1}(t-kT+\tau_{-1})$$

and $$r_1(t)=\Sigma a_1[k]h_1(t-kT+\tau_1),$$

where $h_{-1}(t)$ represents the inter-track interference response from the previous track, $h_1(t)$ represents the inter-track interference response from the next track, $\tau_{-1}$ represents the phase delay of the track being read with respect to the previous track, and $\tau_1$ represents the phase delay of the track being read with respect to the next track. The functions $h_{-1}(.)$ and $h_1(.)$ are interference models based on various criteria including the relative proximity of adjacent tracks. Such models may be developed for a particular storage device or medium. Accounting for the inter-track interference, equalized output 803 (in continuous-time) may be represented by the following equation:

$$r(t)=r_0(t)+r_1(t)+r_{-1}(t).$$

Thus, discrete-time version of the equalized output 803 may be represented by the following equation:

$$r[n]=r(nT)=\Sigma a_0[k]g_0[n-k]+\Sigma a_1[k]g_1[n-k]+\Sigma a_{-1}[k]g_{-1}[n-k],$$

where $g_0[k]=h_0(kT)$, $g_1[k]=h_1(kT+\tau_1)$, and $g_{-1}[k]=h_{-1}(kT+\tau_{-1})$.

Gap compensating inter-track interference compensation circuit 800 includes a buffer 810 that stores hard data bits retrieved from a previous track (i.e., a track located on a first side of the track being processed) modified by hard bits corresponding to a track preceding the previous track in the gaps of the previous track, and a buffer 815 that stores hard data bits retrieved from a next track (i.e., a track located on a second side of the track being processed). These hard bits may be stored after a prior processing of data sensed from the respective tracks (i.e., the previous track and the next track). The data from buffer 810 is provided as a data output 812 and is denoted as $a_{-1}[n]$, where n indicates the bit position within the track. The data from buffer 815 is provided as a data output 814 and is denoted as $a_1[n]$, where n indicates the bit position within the track. Data input 812 and data input 814 are provided to an inter-track interference response estimation circuit 820 and an inter-track interference estimator circuit 825. In addition, equalized output 803 is provided to a latency circuit 835.

Latency circuit 835 delays equalized output 803 in time to match the latency involved in calculating inter-track interference responses by inter-track interference estimator circuit 820 and in calculating inter-track interference by inter-track interference estimator circuit 825. The delayed signals are provided as a delayed output 837 to an inter-track interference cancellation circuit 830.

Inter-track interference response estimator circuit 820 calculates an estimated inter-track interference response from the previous track ($\hat{g}_{-1}[k]$) and provides it as a previous track interference output 822. Previous track interference response 822 satisfies the following equation:

$$\hat{g}_{-1}[k] = \frac{1}{N_{-1}}\sum_{n=1}^{N_{-1}} a_{-1}[n-k]\cdot r[n].$$

where $N_{-1}$ is the number of data bits available from a previous track, and $a_{-1}[n]$ are corresponding bits from a previous track. In some cases, the estimated outputs may be estimated using an adaptation approach, rather than by correlation computation. Similarly, the inter-track interference response circuit 820 provides an estimated inter-track interference response from the next track ($\hat{g}_1[k]$) that satisfies the following equation:

$$\hat{g}_1[k] = \frac{1}{N_1}\sum_{n=1}^{N_1} a_1[n-k]\cdot r[n],$$

where $N_1$ is the number of data bits available from a next track, and $a_1[n-k]$ are corresponding bits from a next track.

Next track interference response 824 and previous track interference response 822 are provided to inter-track interference estimator circuit 825. Inter-track interference estimator circuit 825 estimates the inter-track interference from the previous track ($\hat{r}_{-1}[n]$) and provides it as a previous track interference output 827. Previous track interference output 827 is estimated (i.e., calculated) in accordance with the following equation:

$$\hat{r}_{-1}[n]=\Sigma a_{-1}[n-k]\hat{g}_{-1}[k].$$

Similarly, inter-track interference estimator circuit 825 estimates the inter-track interference from the next track ($\hat{r}_1[n]$) for the block m and provides it as a next track interference output 829. Next track interference output 829 is estimated (i.e., calculated) in accordance with the following equation:

$$\hat{r}_1[n]=\Sigma a_1[n-k]\hat{g}_1[k].$$

Next track interference output 829 and previous track interference output 827 are provided to inter-track interference cancellation circuit 830 along with delayed output 837. Inter-track interference cancellation circuit 830 subtracts the inter-track interference signals from the delayed output to yield an inter-track interference compensated output 832 ($\hat{r}_0[n]$), across the bit periods included in the block m. Inter-track interference compensated output 832 is calculated in accordance with the following equation:

$$\hat{r}_0[n]=r[n]-\hat{r}_1[n]-\hat{r}_{-1}[n].$$

A gap determination and hard data load circuit 890 receives hard data 896 from the current track being processed, and loads it into previous track buffer 810. Such loading is prevented when hard data 896 corresponds to a gap in the current track. The existence of a gap in the current track is determined based on an end of sector 892 and a start of sector 894. Thus, previous track buffer 810 is updated with hard data from the current track, except for when the current track has a gap in which case the data in previous track buffer 810 is not overwritten, leaving the data from the prior track. Thus, as the next track is read and processed, the data in previous track buffer 810 is the data from the previous track for regions where there is no gap, and data from the second previous track for gap regions of the previous track. As a specific example using FIG. 2b, where track N is being read and processed, the hard data corresponding to synchronization data 244, user data region 246 and synchronization data 249 is written to previous track buffer 810 in preparation for later processing of track N+1. In contrast, data previously written to previous track buffer 810 from track N−1 that corresponds to gap 242 (i.e., a portion of user data region 250) and gap 248 (i.e., a portion of user data region 256) are not overwritten and remain in previous track buffer 810 for use in relation to cancelling inter-track interference for track N+1.

As just some of many advantages achievable through use of a gap compensating inter-track interference cancellation circuit, inter-track interference can be compensated in a shingle writing situation where information from multiple preceding tracks are accommodated in the cancellation. Based upon the disclosure provided herein, one of ordinary skill in the art will recognize a variety of other advantages that may be achieved in accordance with various embodiments of the present invention.

Figure 9:
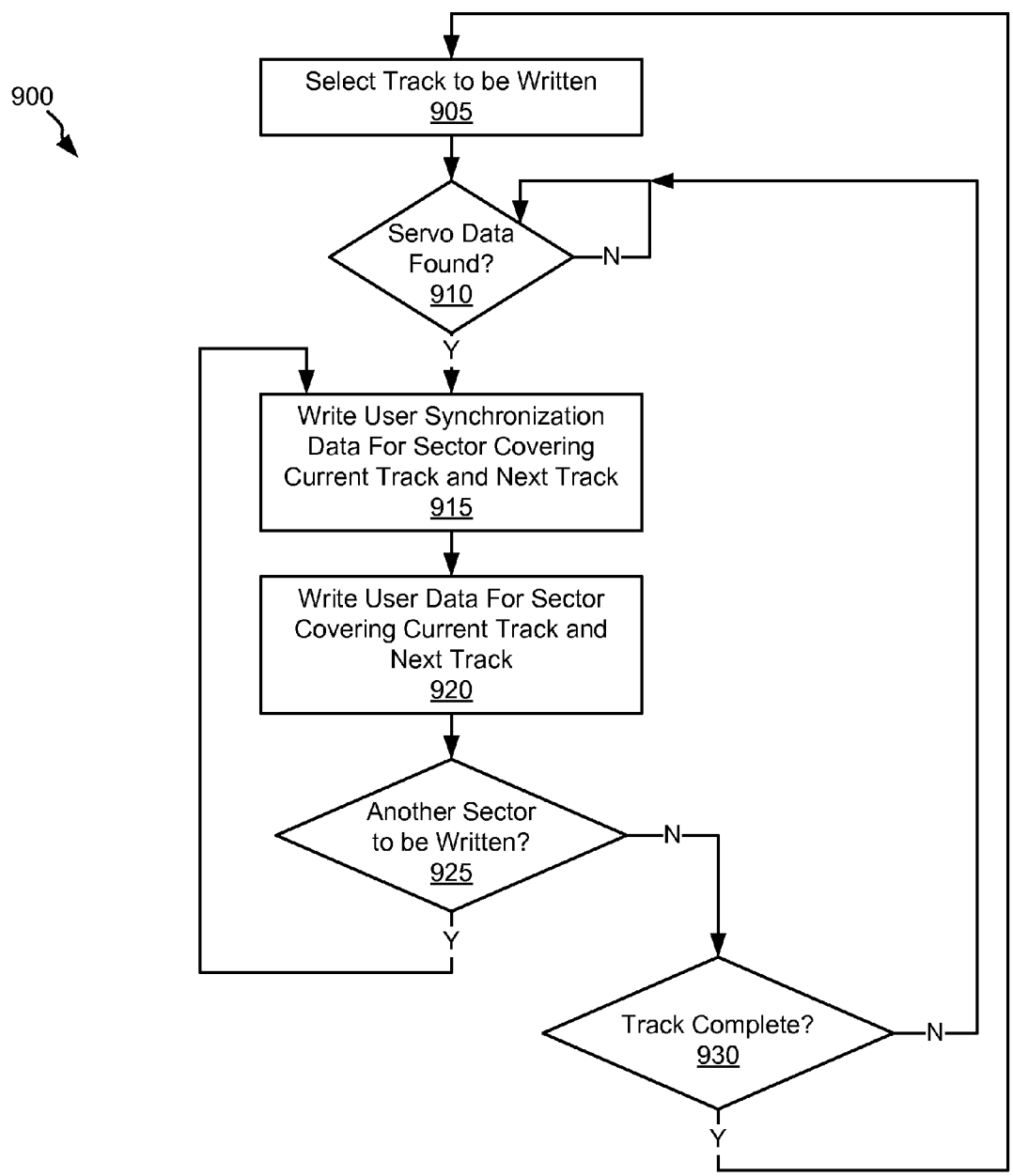
FIG. 9 is a flow diagram showing a shingled write approach that may occur in relation to various embodiments of the present invention.

Turning to FIG. 9, a flow diagram 900 shows a shingled write approach that may occur in relation to various embodiments of the present invention. Following flow diagram 900, an initial track to be written is selected (block 905). Using FIG. 2b as an example, selecting the initial track to be written may include selecting track N−2. A read/write head assembly is positioned relative to the selected track and it is determined whether the servo wedge data has been identified (block 910). Once the servo wedge data has been found and processed (block 910), user synchronization data preceding actual user data for the sector is written between the servo wedge data regions (block 915). This synchronization data may be any synchronization data known in the art and is used to synchronize to the data during a read back. As the data is a shingled write, the written data covers both the current track being written and the next track. Thus, in the example, the data being written covers the initially selected track N−2 and track N−1. Once the synchronization data has been written (block 915), user data is written (block 920). Again, when the write is ongoing, the data is written covering the initially selected track N−2 and track N−1. Once the write is completed (block 920), it is determined whether another sector is to be written between the servo wedges (block 925). Where another sector is to be written (block 925), the processes of blocks 915-925 are repeated for the next sector. Otherwise, it is determined whether the track write is complete (bock 930). Where the track is not complete (block 930), the processes of blocks 910-925 are repeated for the next servo wedge. Otherwise, the next track to be written is selected (block 905) and the processes of blocks 910-930 are repeated for the next track. Following the example of FIG. 2b, the next track would be track N−1 which when written would overwrite the spill over of the write to track N−2 onto track N−1, and the write to track N−1 will spill over onto track N.

Figure 10:
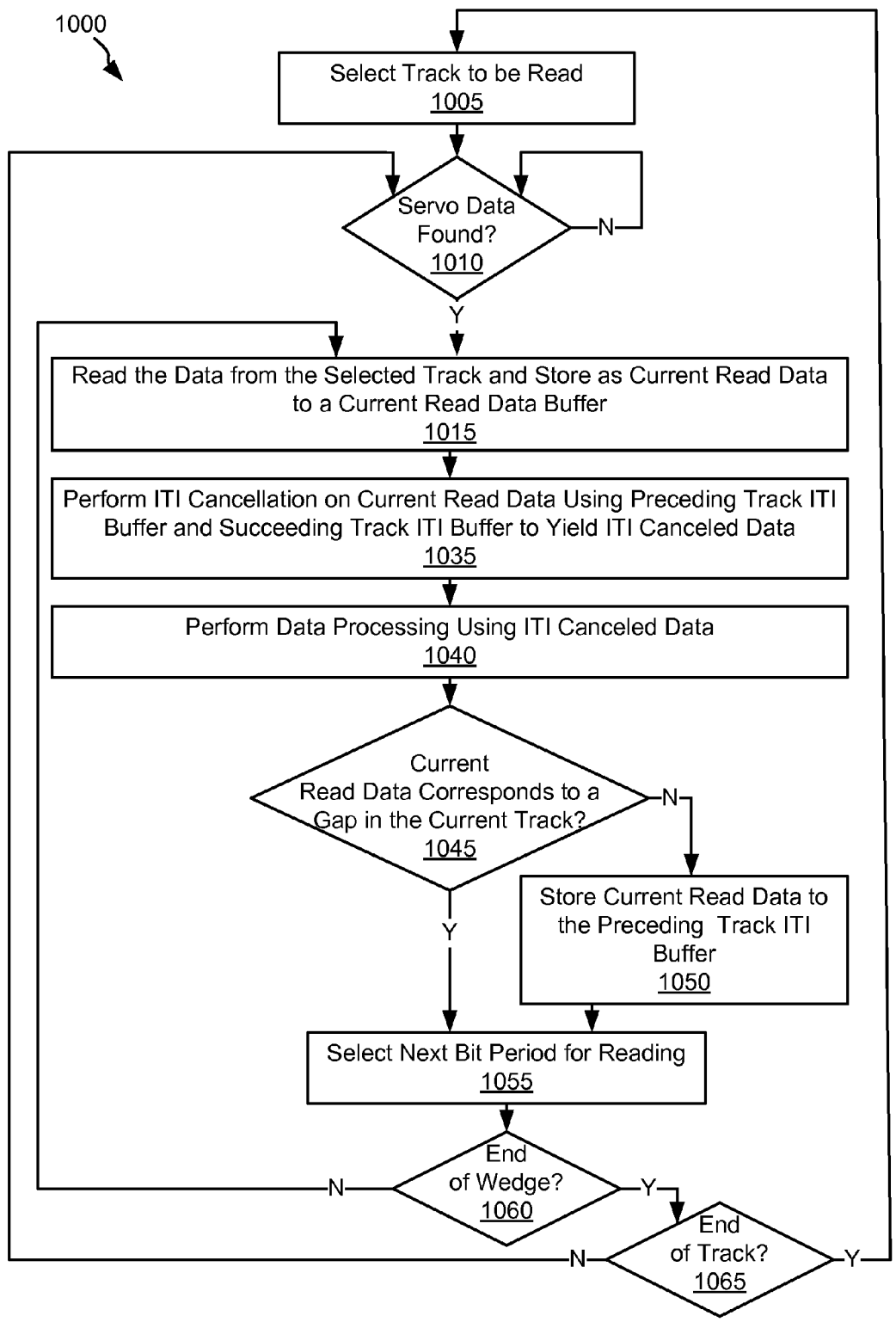
FIG. 10 is a flow diagram showing a method in accordance with various embodiments of the present invention for gap compensation in an inter-track interference cancellation approach.

Turning to FIG. 10, a flow diagram 1000 shows a method in accordance with various embodiments of the present invention for gap compensation in an inter-track interference cancellation approach. Following flow diagram 1000, a track to be read is selected (block 1005). Prior to making such a selection the hard data corresponding to the next track and the previous track have been loaded into respective inter-track interference buffers. Thus, for example, where track N is selected for reading, a succeeding track inter-track interference buffer holding the hard data corresponding to the track N+1 is loaded, and the data corresponding to track N−1 for the regions of user data region 250, synchronization data 254 and user data region 256, and the data from track N−2 corresponding to gap 252 (i.e., a portion of gap 262 and a subsequent portion of synchronization data 264) and gap 258 (i.e., a portion of gap 268 and a subsequent portion of track N−2) is loaded into a preceding track inter-track interference buffer.

A read/write head assembly is positioned relative to the selected track and it is determined whether the servo wedge data has been identified (block 1010). Once the servo wedge data has been found and processed (block 1010), data is read from the selected track and stored as current read data to a current read data buffer (bock 1015). Inter-track interference cancellation is performed on the current read data using the preceding track inter-track interference buffer and the succeeding track inter-track interference buffer to yield inter-track interference canceled data (block 1035). This inter-track interference canceled data is provided to a downstream data processing circuit to yield hard data corresponding to the selected track (block 1040). Such downstream processing may be any processing circuit known in the art. In one particular embodiment of the present invention, the downstream processing may include performing one or more iterations of a combination of a maximum a posteriori data detection process and a low density parity check decoding process. Based on the disclosure provided herein, one of ordinary skill in the art will recognize various processing circuits and approaches that may be used in accordance with different embodiments of the present invention to yield hard data from the inter-track interference canceled data.

As the hard data corresponding to the selected track become available it is determined whether the bits correspond to a gap in the current track (block 1045). Thus, using the example of FIG. 2b, it is determined whether the hard data for the current track (e.g., track N) corresponds to gap 242 or gap 248. Where the hard data does not correspond to a gap (block 1045), the current read data is stored to the preceding track inter-track interference buffer (block 1050). Otherwise, where the hard data correspond to a gap (block 1045), the prior value in the preceding track inter-track interference buffer remains as it is not overwritten by the current data. Thus, using the example of FIG. 2b where the current track is track N, data from a portion of user data region 250 of track N−1 corresponding to gap 242 and data from a portion of user data region 256 of track N−1 corresponding to gap 248 remain in the preceding track inter-track interference buffer.

The next bit period is then selected (block 1055). It is determined if the end of the wedge (i.e., the region between servo data wedges) has been reached (block 1060). Where the end of the wedge has not yet been reached (block 1060), the processes of blocks 1015-1060 is repeated for the next bit period. Alternatively, where the end of the wedge has been reached (block 1060), it is determined whether the end of the track has been reached (block 1065). Where the end of the track has not yet been reached (block 1065), the processes of blocks 1010-1065 are repeated for the remaining portion of the current track. Otherwise, the next track is selected and the processes of blocks 1010-1065 are repeated for the next track. By following this approach, the preceding track inter-track interference buffer is prepared for processing the next track when a consecutive track read is followed by including data from a track preceding the preceding track that corresponds to gaps in the preceding track.

Figure 11:
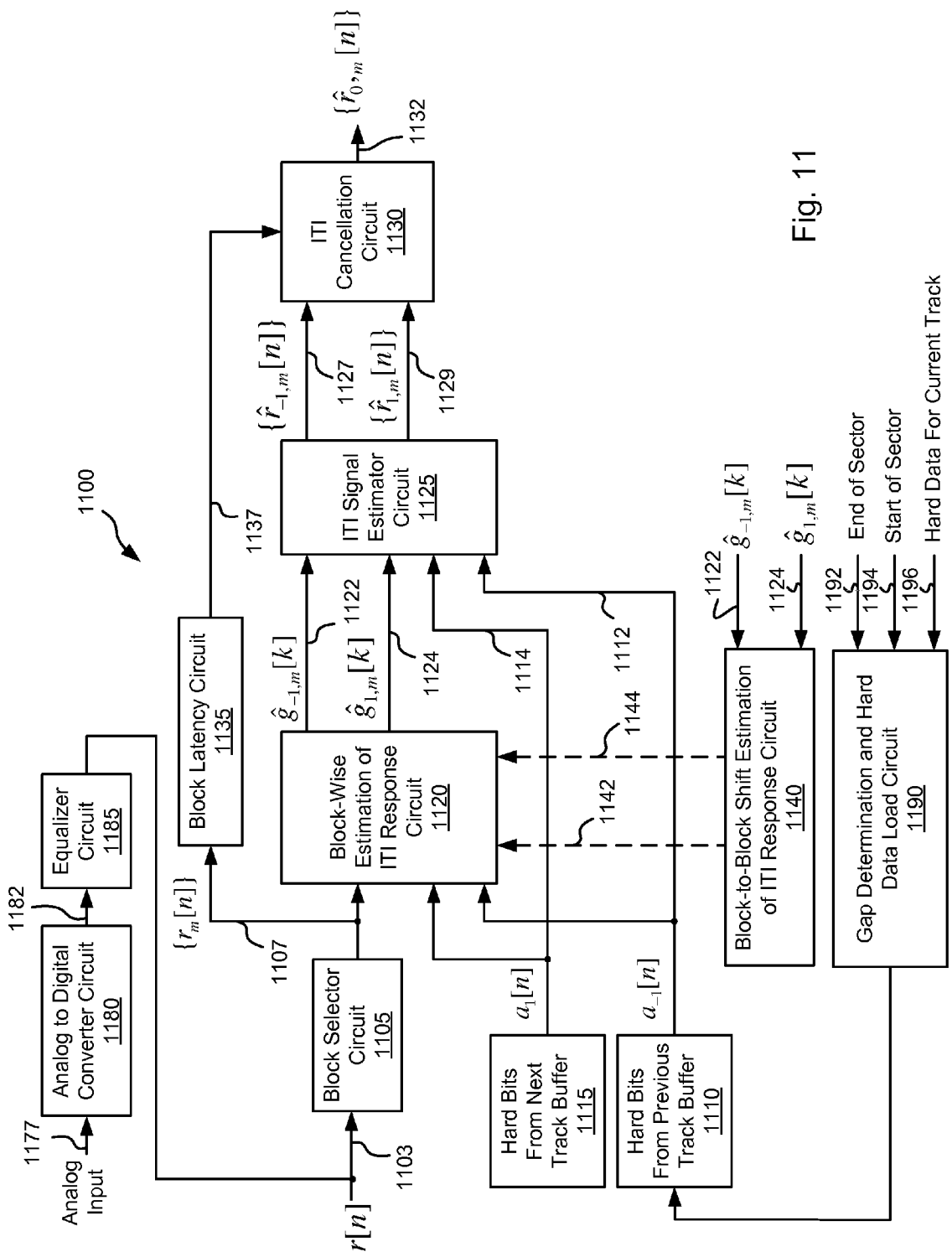
FIG. 11 depicts a combination gap compensating and frequency offset compensating inter-track interference cancellation circuit in accordance with some embodiments of the present invention.

Turning to FIG. 11, a combination gap compensating and frequency offset compensating inter-track interference cancellation circuit 1100 us depicted in accordance with some embodiments of the present invention. Circuit 1100 receives an analog input signal 1177. Analog input signal 1177 may be derived, for example, from a read/write head assembly (not shown) disposed in relation to a storage medium (not shown), and represents information sensed from the storage medium. Analog input signal 1177 is provided to an analog to digital converter circuit 1180 that operates to convert the analog signal into a series of digital samples 1182 corresponding to analog input signal 1177. Analog to digital converter circuit 1180 may be any circuit known in the art that is capable of converting an analog signal into corresponding series of digital samples. Based upon the disclosure provided herein, one of ordinary skill in the art will recognize a variety of analog to digital converter circuits and/or architectures that may be used in relation to different embodiments of the present invention. Digital samples 1182 are provided to an equalizer circuit 1185 that equalizes the digital samples and provides an equalized output 1103 (r[n]) to a block selector circuit 1105. In some embodiments of the present invention, equalizer circuit 1185 may be implemented as a digital finite impulse response circuit as are known in the art. Based upon the disclosure provided herein, one of ordinary skill in the art will recognize a variety of equalizer circuits and/or architectures that may be used in relation to different embodiments of the present invention. Where inter-track interference is not a concern (i.e., the tracks are separated by substantial distance), continuous-time version of the equalized output 1103 is represented by the following equation:

$$r_0[t] = \Sigma a_0[k] h_0(t-kT),$$

where $a_0[k]$ represents the currently sensed bit period from the storage medium, T denotes the duration of one bit, and $h_0(t)$ represents the inter-symbol interference function (i.e., interference from adjacent symbols along the same track). The inter-track interference corresponding to the two tracks on either side of the current track in equalized output 1103 (i.e., an inter-track interference from a previous track $r_{-1}(t)$, and an inter-track interference from a next track $r_1(t)$) may be represented by the following equations, respectively:

$$r_{-1}(t) = \Sigma a_{-1}[k] h_{-1}(t-kT+\tau_{-1})$$

and $$r_1(t) = \Sigma a_1[k] h_1(t-kT+\tau_1),$$

where $h_{-1}(t)$ represents the inter-track interference response from the previous track, $h_1(t)$ represents the inter-track interference response from the next track, $\tau_{-1}$ represents the phase delay of the track being read with respect to the previous track, and $\tau_1$ represents the phase delay of the track being read with respect to the next track. The functions $h_{-1}(.)$ and $h_1(.)$ are interference models based on various criteria including the relative proximity of adjacent tracks. Such models may be developed for a particular storage device or medium. Accounting for the inter-track interference, equalized output 1103 (in continuous-time) may be represented by the following equation:

$$r(t) = r_0(t) + r_1(t) + r_{-1}(t).$$

Thus, discrete-time version of the equalized output 1103 may be represented by the following equation:

$$r[n] = r(nT) = \Sigma a_0[k] g_0[n-k] + \Sigma a_1[k] g_1[n-k] + \Sigma a_{-1}[k] g_{-1}[n-k],$$

where $g_0[k] = h_0(kT)$, $g_1[k] = h_1(kT+\tau_1)$, and $g_{-1}[k] = h_{-1}(kT+\tau_{-1})$.

Combined gap compensating and frequency offset compensating inter-track interference compensation circuit 1100 includes a buffer 1110 that stores hard data bits retrieved from a previous track (i.e., a track located on a first side of the track being processed), and a buffer 1115 that stores hard data bits retrieved from a next track (i.e., a track located on a second side of the track being processed). These hard bits are stored after a prior processing of data sensed from the respective tracks (i.e., the previous track and the next track). The data from buffer 1110 is provided as a data output 1112 and is denoted as $a_{-1}[n]$, where n indicates the bit position within the track. The data from buffer 1115 is provided as a data output 1114 and is denoted as $a_1[n]$, where n indicates the bit position within the track. Data input 1112 and data input 1114 are provided to a block-wise estimation of inter-track interference response circuit 1120 and an inter-track interference estimator circuit 1125.

A block selector circuit 1105 identifies a block 1107 of bit periods $\{r_m[n]\}$ over which inter-track interference compensation is to be performed, where m indicates the particular block that is selected and n indicates a given bit period along a track within the block. In some cases, the block size may be indicated as a letter i. In such cases, the value of n would extend from the first bit period in the selected block to the first bit period plus i−1. Thus, for example, if the first bit period in the selected block is j, the block would include r[n], $a_1[n]$ and $a_{-1}[n]$ where n extends between j and i+j−1. The size of the block selected may be predetermined and based upon a certain maximum frequency error and/or jitter expected between adjacent tracks, or may be variable and calculated based upon the estimated phase offset across a given number of sequential bit periods. Based upon the disclosure provided herein, one of ordinary skill in the art will recognize a variety of block sizes that may be used in relation to different embodiments of the present invention. Block 1107 is provided to block-wise estimation of inter-track interference response circuit 1120, and to a block latency circuit 1135.

Block latency circuit 1135 delays block 1107 in time to match the latency involved in calculating inter-track interference responses by block-wise estimation of inter-track interference response circuit 1120 and in calculating inter-track interference by inter-track interference estimator circuit 1125. The delayed signals are provided as a delayed output 1137 to an inter-track interference cancellation circuit 1130.

A block-to-block shift estimation of inter-track interference response circuit 1140 calculates a phase delay 1142 of the track being read with respect to the previous track, and a phase delay 1144 of the track being read with respect to the next track. This calculation is done by determining the indices of the maximum tap coefficients in the estimated inter-track interference responses that was used in generating previous track interference output 1127 and next track interference output 1129. Where the maximum filter tap of the inter-track interference response used in calculating a respective one of previous track interference output 1127 is one of the taps to the right of center or the left of center in block-wise estimation of inter-track interference response circuit 1120, then phase delay 1142 is selected to cause a shift of the maximum tap back toward the center of the filter. Similarly, where the maximum filter tap of the inter-track interference response used in calculating a respective one of next track interference output 1129 is one of the taps to the right of center or the left of center in block-wise estimation of inter-track interference response circuit 1120, then phase delay 1144 is selected to cause a shift of the maximum tap back toward the center of the filter. Phase delay 1142 and phase delay 1144 are provided along with data output 1112, data output 1114 and block 1107 to block-wise estimation of inter-track interference response circuit 1120.

Block-wise estimation of inter-track interference response circuit 1120 calculates an estimated inter-track interference response from the previous track ($\hat{g}_{-1,m}[k]$) and provides it as a previous track interference output 1122. Previous track interference response 1122 satisfies the following equation:

$$\hat{g}_{-1,m}[k] = \frac{1}{N_{-1}} \sum_{n=1}^{N_{-1}} a_{-1}[n+(m-1)N_b-k-\delta_{-1,m}] \cdot r[n+(m-1)N_b]$$

$$\delta_{-1,m} = \delta_{-1,m-1} + k_{-1,m-1}$$

where $\delta_{-1,m}$ denotes the shift in correlator reference required for centering the inter-track interference response from the previous track $\hat{g}_{-1,m}[k]$, $N_b$ denotes the block-size, and $k_{-1,m-1}$ denotes index of the maximum tap coefficient in $\hat{g}_{-1,m-1}[k]$. In some cases, the estimated outputs may be estimated using an adaptive approach, rather than by correlation computation. Similarly, block-wise estimation of inter-track interference response circuit 1120 calculates an estimated inter-track interference response from the next track ($\hat{g}_{1,m}[k]$) and provides it as a next track interference response 1124. Next track interference response 1124 is calculated in accordance with the following equation:

$$\hat{g}_{1,m}[k] = \frac{1}{N_1} \sum_{n=1}^{N_1-1} a_1[n+(m-1)N_b-k-\delta_{1,m}] \cdot r[n+(m-1)N_b]$$

$$\delta_{1,m} = \delta_{1,m-1} + k_{1,m-1}$$

where $\delta_{1,m}$ denotes the shift in correlator reference required for centering the inter-track interference response from the previous track $\hat{g}_{1,m}[k]$ and $k_{1,m-1}$ denotes index of the maximum tap coefficient in $\hat{g}_{1,m-1}[k]$. Starting phase offsets $\delta_{-1,0}$ and $\delta_{1,0}$ are initialized to zero, if sectors are phase synchronized at the beginning and/or if no a priori information on phase offset is available.

Next track interference response 1124 and previous track interference response 1122 are provided to inter-track interference estimator circuit 1125. Inter-track interference estimator circuit 1125 estimates the inter-track interference from the previous track ($\{\hat{r}_{-1,m}[n]\}$) for the block m and provides it as a previous track interference output 1127. Previous track interference output 1127 is estimated (i.e., calculated) in accordance with the following equation:

$$\hat{r}_{-1,m}[n] = \Sigma a_{-1}[n+(m-1)N_b-\delta_{-1,m}-k]\hat{g}_{-1,m}[k],$$

across the bit periods included in the block m. Similarly, inter-track interference estimator circuit 325 estimates the inter-track interference from the next track ($\{\hat{r}_{1,m}[n]\}$) for the block m and provides it as a next track interference output 1129. Next track interference output 1129 is estimated (i.e., calculated) in accordance with the following equation:

$$\hat{r}_{1,m}[n] = \Sigma a_1[n+(m-1)N_b-\delta_{1,m}-k]\hat{g}_{1,m}[k],$$

across the bit periods included in the block m.

Next track interference output 1129 and previous track interference output 1127 are provided to inter-track interference cancellation circuit 1130 along with delayed output 1137. Inter-track interference cancellation circuit 1130 subtracts the inter-track interference signals from the delayed output to yield an inter-track interference compensated output 1132 ($\{\hat{r}_{0,m}[n]\}$), across the bit periods included in the block m. Inter-track interference compensated output 1132 is calculated in accordance with the following equation:

$$\hat{r}_{0,m}[n] = r_m[n] - \hat{r}_{1,m}[n] - \hat{r}_{-1,m}[n],$$

across the bit periods included in the block m.

A gap determination and hard data load circuit 1190 receives hard data 1196 from the current track being processed, and loads it into previous track buffer 1110. Such loading is prevented when hard data 1196 corresponds to a gap in the current track. The existence of a gap in the current track is determined based on an end of sector 1192 and a start of sector 1194. Thus, previous track buffer 1110 is updated with hard data from the current track, except for when the current track has a gap in which case the data in previous track buffer 1110 is not overwritten, leaving the data from the prior track. Thus, as the next track is read and processed, the data in previous track buffer 1110 is the data from the previous track for regions where there is no gap, and data from the second previous track for gap regions of the previous track. As a specific example using FIG. 2b, where track N is being read and processed, the hard data corresponding to synchronization data 244, user data region 246 and synchronization data 249 is written to previous track buffer 1110 in preparation for later processing of track N+1. In contrast, data previously written to previous track buffer 1110 from track N-1 that corresponds to gap 242 (i.e., a portion of user data region 250) and gap 248 (i.e., a portion of user data region 256) are not overwritten and remain in previous track buffer 1110 for use in relation to cancelling inter-track interference for track N+1.

As just some of many advantages achievable through use of gap compensating and frequency offset compensating a block-wise inter-track interference estimation and cancellation circuitry: inter-track interference can be compensated using less circuitry than may be required if a digital phase locked loop and interpolation techniques are used to compensate; and inter-track interference can be compensated in a shingled writing situation where information from multiple preceding tracks are accommodated in the cancellation. Based upon the disclosure provided herein, one of ordinary skill in the art will recognize a variety of other advantages that may be achieved in accordance with various embodiments of the present invention.

Figure 12:
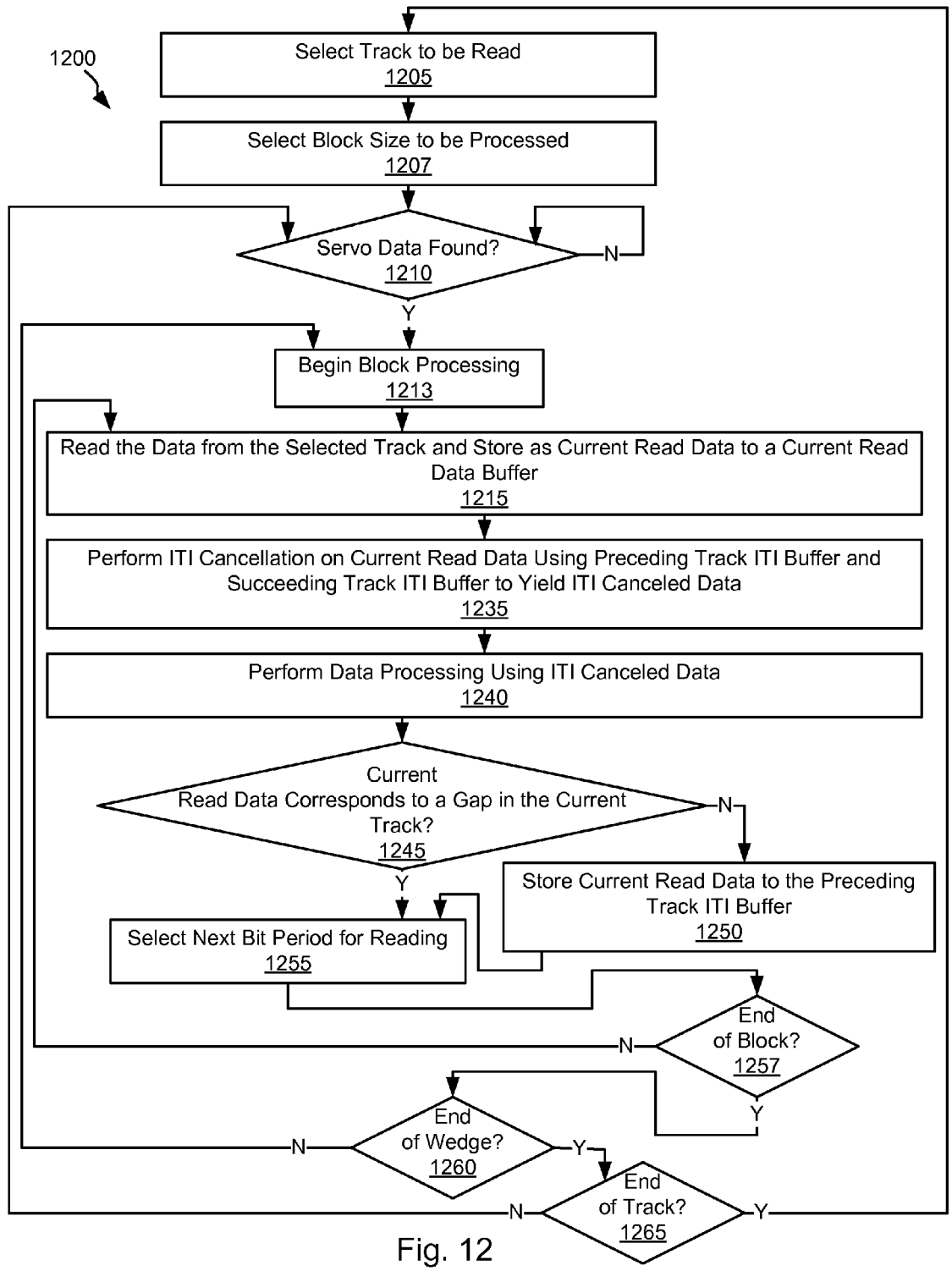
FIG. 12 is a flow diagram showing a method in accordance with some embodiments of the present invention for blockwise gap compensation in an inter-track interference cancellation approach.

Turning to FIG. 12, a flow diagram 1200 shows a method in accordance with some embodiments of the present invention for block-wise gap compensation and frequency offset compensation in an inter-track interference cancellation approach. Following flow diagram 1200, a track to be read is selected (block 1205). Prior to making such a selection the hard data corresponding to the next track and the previous track have been loaded into respective inter-track interference buffers. Thus, for example, where track N is selected for reading, a succeeding track inter-track interference buffer holding the hard data corresponding to the track N+1 is loaded, and the data corresponding to track N-1 for the regions of user data region 250, synchronization data 254 and user data region 256, and the data from track N-2 corresponding to gap 252 (i.e., a portion of gap 262 and a subsequent portion of synchronization data 264) and gap 258 (i.e., a portion of gap 268 and a subsequent portion of track N-2) is loaded into a preceding track inter-track interference buffer.

In addition, the size of the blocks to be treated together during block-wise inter-track interference compensation is selected (block 1207). The size of the blocks selected may be predetermined and based upon a certain maximum frequency error and/or jitter expected between adjacent tracks, or may be variable and calculated based upon the estimated phase offset across a given number of sequential bit periods. Based upon the disclosure provided herein, one of ordinary skill in the art will recognize a variety of block sizes that may be used in relation to different embodiments of the present invention.

A read/write head assembly is positioned relative to the selected track and it is determined whether the servo wedge data has been identified (block 1210). Once the servo wedge data has been found and processed (block 1210), block processing for the current block begins (block 1213). Data is read from the selected track and stored as current read data to a current read data buffer (bock 1215). Inter-track interference cancellation is performed on the current read data using the preceding track inter-track interference buffer and the succeeding track inter-track interference buffer to yield inter-track interference canceled data (block 1235). This inter-track interference canceled data is provided to a downstream data processing circuit to yield hard data corresponding to the selected track (block 1240). Such downstream processing may be any processing circuit known in the art. In one particular embodiment of the present invention, the downstream processing may include performing one or more iterations of a combination of a maximum a posteriori data detection process and a low density parity check decoding process. Based on the disclosure provided herein, one of ordinary skill in the art will recognize various processing circuits and approaches that may be used in accordance with different embodiments of the present invention to yield hard data from the inter-track interference canceled data.

As the hard data corresponding to the selected track become available it is determined whether the bits correspond to a gap in the current track (block 1245). Thus, using the example of FIG. 2b, it is determined whether the hard data for the current track (e.g., track N) corresponds to gap 242 or gap 248. Where the hard data does not correspond to a gap (block 1245), the current read data is stored to the preceding track inter-track interference buffer (block 1250). Otherwise, where the hard data correspond to a gap (block 1245), the prior value in the preceding track inter-track interference buffer remains as it is not overwritten by the current data. Thus, using the example of FIG. 2b where the current track is track N, data from a portion of user data region 250 of track N−1 corresponding to gap 242 and data from a portion of user data region 256 of track N−1 corresponding to gap 248 remain in the preceding track inter-track interference buffer.

The next bit period is then selected (block 1255). It is then determined whether the next bit period is within the currently processing block, or is beyond the currently processing block (block 1257). Where the next bit period is within the currently processing block (block 1257), the processes of blocks 1215-1257 is repeated for the next bit period. Otherwise, where the next bit period is outside the currently processing block (block 1257), it is determined if the end of the wedge (i.e., the region between servo data wedges) has been reached (block 1260). Where the end of the wedge has not yet been reached (block 1260), the processes of blocks 1213-1260 is repeated for the next block. Alternatively, where the end of the wedge has been reached (block 1260), it is determined whether the end of the track has been reached (block 1265). Where the end of the track has not yet been reached (block 1265), the processes of blocks 1210-1265 are repeated for the remaining portion of the current track. Otherwise, the next track is selected and the processes of blocks 1210-1265 are repeated for the next track. By following this approach, the preceding track inter-track interference buffer is prepared for processing the next track when a consecutive track read is followed by including data from a track preceding the preceding track that corresponds to gaps in the preceding track.

Figure 13:
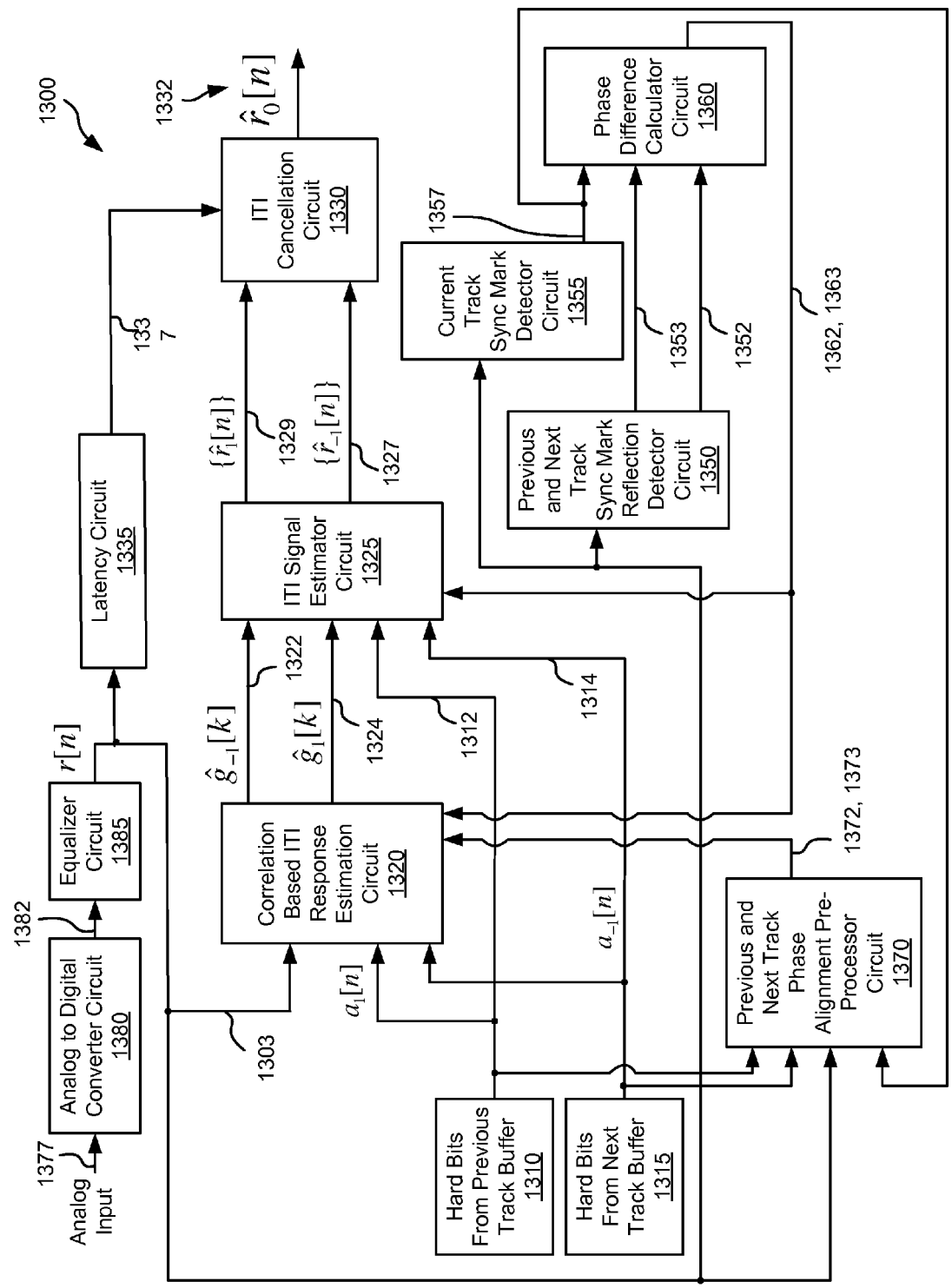
FIG. 13 depicts a data alignment based inter-track interference cancellation circuit in accordance with some embodiments of the present invention.

FIG. 13 depicts a data alignment based inter-track interference cancellation circuit 1300 in accordance with some embodiments of the present invention. Inter-track interference compensation circuit 1300 receives an analog input signal 1377. Analog input signal 1377 may be derived, for example, from a read/write head assembly (not shown) disposed in relation to a storage medium (not shown), and represents information sensed from the storage medium. Analog input signal 1377 is provided to an analog to digital converter circuit 1380 that operates to convert the analog signal into a series of digital samples 1382 corresponding to analog input signal 1377. Analog to digital converter circuit 1380 may be any circuit known in the art that is capable of converting an analog signal into corresponding series of digital samples. Based upon the disclosure provided herein, one of ordinary skill in the art will recognize a variety of analog to digital converter circuits and/or architectures that may be used in relation to different embodiments of the present invention. Digital samples 1382 are provided to an equalizer circuit 1385 that equalizes the digital samples and provides an equalized output 1303 ($r[n]$) to a correlation based inter-track interference response estimation circuit 1320. In some embodiments of the present invention, equalizer circuit 1385 may be implemented as a digital finite impulse response circuit as are known in the art. Based upon the disclosure provided herein, one of ordinary skill in the art will recognize a variety of equalizer circuits and/or architectures that may be used in relation to different embodiments of the present invention. Where inter-track interference is not a concern (i.e., the tracks are separated by substantial distance), continuous-time version of the equalized output 1303 is represented by the following equation:

$$r_0[t] = \Sigma a_0[k] h_0(t-kT),$$

where $a_0[k]$ represents the currently sensed bit period from the storage medium, T denotes the duration of one bit, and $h_0(t)$ represents the inter-symbol interference function (i.e., interference from adjacent symbols along the same track). The inter-track interference corresponding to the two tracks on either side of the current track in equalized output 1303 (i.e., an inter-track interference from a previous track $r_{-1}(t)$, and an inter-track interference from a next track $r_1(t)$) may be represented by the following equations, respectively:

$$r_{-1}(t) = \Sigma a_{-1}[k] h_{-1}(t-kT+\tau_{-1})$$

and $$r_1(t) = \Sigma a_1[k] h_1(t-kT+\tau_1),$$

where $h_{-1}(t)$ represents the inter-track interference response from the previous track, $h_1(t)$ represents the inter-track interference response from the next track, $\tau_{-1}$ represents the phase delay of the track being read with respect to the previous track, and $\tau_1$ represents the phase delay of the track being read with respect to the next track. The functions $h_{-1}(.)$ and $h_1(.)$ are interference models based on various criteria including the relative proximity of adjacent tracks. Such models may be developed for a particular storage device or medium. Accounting for the inter-track interference, equalized output 1303 (in continuous-time) may be represented by the following equation:

$$r(t) = r_0(t) + r_1(t) + r_{-1}(t).$$

Thus, discrete-time version of the equalized output 1303 may be represented by the following equation:

$$r[n] = r(nT) = \Sigma a_0[k] g_0[n-k] + \Sigma a_1[k] g_1[n-k] + \Sigma a_{-1}[k] g_{-1}[n-k],$$

where $g_0[k] = h_0(kT)$, $g_1[k] = h_1(kT+\tau_1)$, and $g_{-1}[k] = h_{-1}(kT+\tau_{-1})$. Assuming $\{a_0[n], a_{-1}[n], a_1[n]\}$ are mutually uncorrelated bit streams, the expected values for the functions $h_{-1}(.)$ and $h_1(.)$ are defined as follows:

$$E[r[n] \cdot a_{-1}[n-n_{-1}]] = g_{-1}[n_{-1}] = h_{-1}(n_{-1}T+\hat{\tau}_{-1});$$

and $$E[r[n] \cdot a_1[n-n_1]] = g_{-1}[n_1] = h_1(n_1T+\hat{\tau}_1),$$

respectively.

Inter-track interference compensation circuit 1300 includes a buffer 1310 that stores hard data bits retrieved from a previous track (i.e., a track located on a first side of the track being processed), and a buffer 1315 that stores hard data bits retrieved from a next track (i.e., a track located on a second side of the track being processed). These hard bits may be stored after a prior processing of data sensed from the respective tracks (i.e., the previous track and the next track). The data from buffer 1310 is provided as a data output 1312 and is denoted as $a_{-1}[n]$, where n indicates the bit position within the track. The data from buffer 1315 is provided as a data output 1314 and is denoted as $a_1[n]$, where n indicates the bit position within the track. Data input 1312 and data input 1314 are provided to correlation based inter-track interference response circuit 1320 and an inter-track interference estimator circuit 1325.

Latency circuit 1335 delays equalized output 1303 in time to match the latency involved in calculating inter-track interference responses by inter-track interference estimator circuit 1320 and in calculating inter-track interference by inter-track interference estimator circuit 1325. The delayed signals are provided as a delayed output 1337 to an inter-track interference cancellation circuit 1330. The equalized output 1303 is also given as inputs to previous and next track sync mark reflection detector circuit 1350, and previous and next track phase alignment pre-processor circuit 1370.

Correlation based inter-track interference response circuit 1320 calculates an estimated inter-track interference response from the previous track ($\hat{g}_{-1}[k]$) and provides it as a previous track interference output 1322. Previous track interference response 1322 satisfies the following equation:

$$\hat{g}_{-1}[k] = \frac{1}{N_{-1}} \sum_{n=1}^{N_{-1}} a_{-1}[n-k] \cdot r[n],$$

where $N_{-1}$ is the number of data bits available from a previous track, and $a_{-1}[n]$ are corresponding bits from a previous track. Similarly, correlation based inter-track interference response circuit 1320 provides an estimated inter-track interference response from the next track ($\hat{g}_1[k]$) that satisfies the following equation:

$$\hat{g}_1[k] = \frac{1}{N_1} \sum_{n=1}^{N_1} a_1[n-k] \cdot r[n],$$

where $N_1$ is the number of data bits available from a next track, and $a_1[n]$ are corresponding bits from a next track.

Next track interference response 1324 and previous track interference response 1322 are provided to inter-track interference estimator circuit 1325. Inter-track interference estimator circuit 1325 estimates the inter-track interference from the previous track ($\{\hat{r}_{-1}[n]\}$) for the track and provides it as a previous track interference output 1327. Previous track interference output 1327 is estimated (i.e., calculated) in accordance with the following equation:

$$\hat{r}_{-1}[n] = \Sigma a_{-1}[n-k]\hat{g}_{-1}[k],$$

across the bit periods for the track. Similarly, inter-track interference estimator circuit 1325 estimates the inter-track interference from the next track ($\{\hat{r}_1[n]\}$) for the bit periods and provides it as a next track interference output 1329. Next track interference output 1329 is estimated (i.e., calculated) in accordance with the following equation:

$$\hat{r}_1[n] = \Sigma a_1[n-k]\hat{g}_1[k],$$

across the bit periods included in the track.

Next track interference output 1329 and previous track interference output 1327 are provided to inter-track interference cancellation circuit 1330. Inter-track interference cancellation circuit 1330 subtracts the inter-track interference signals from the delayed output to yield an inter-track interference compensated output 1332 ($\{\hat{r}_0[n]\}$), across the bit periods included in the track. Inter-track interference compensated output 1332 is calculated in accordance with the following equation:

$$\hat{r}_0[n] = r[n] - \hat{r}_1[n] - \hat{r}_{-1}[n],$$

across the bit periods included in the track.

Equalized output 1303, data output 1312 from previous track buffer 1310 and data output 1314 from next track buffer 1315 are also provided to a previous track and next track sync mark reflection detector circuit 1350. Previous track and next track sync mark reflection detector circuit 1350 queries the equalized output 1303 for reflection of sync marks from previous track and next track through inter-track interference. When the sync mark of the previous track is identified in equalized output 1303, a previous sync found signal 1352 is asserted. It should be noted that in some cases only the pattern corresponding to the previous track sync mark is queried in making a determination as to whether to assert previous sync found signal 1352. In other cases where additional robustness is desired, a combination of the pattern corresponding to the previous track sync mark and at least a portion of a preceding preamble pattern is queried in making a determination as to whether to assert previous sync found signal 1352. Similarly, when the sync mark of the next track is identified in equalized output 1303, a next sync found signal 1353 is asserted. It should be noted that in some cases only the pattern corresponding to the next track sync mark is queried in making a determination as to whether to assert next sync found signal 1353. In other cases where additional robustness is desired, a combination of the pattern corresponding to the next track sync mark and at least a portion of a preceding preamble pattern is queried in making a determination as to whether to assert next sync found signal 1353. As discussed below in relation to FIG. 14, the sync marks in the previous track, next track and current track are carefully selected to be as mutually dissimilar (orthogonal) to avoid confusion between the tracks. Based upon the disclosure provided herein, one of ordinary skill in the art will recognize a variety of methods and/or architectures to locate sync marks from current track, previous track and next track in the equalized output 1303 that may be used in relation to different embodiments of the present invention.

Figure 14:
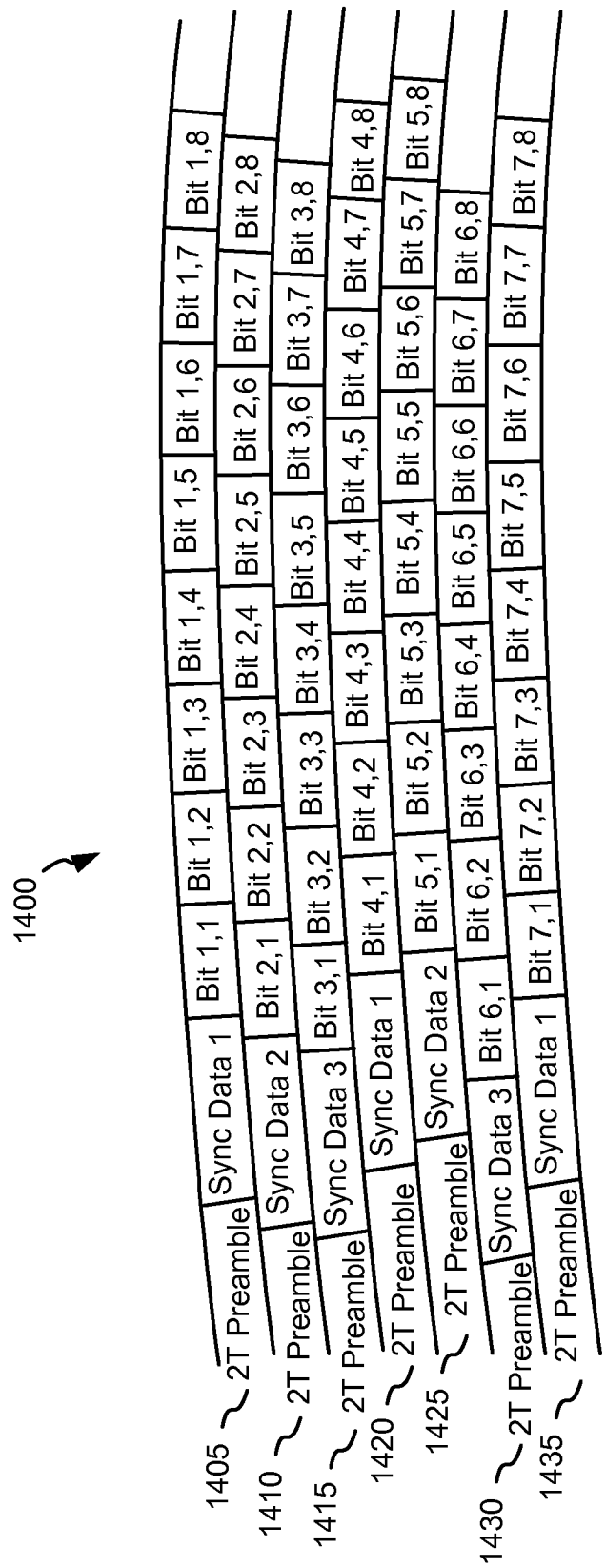
FIG. 14 depicts an example track to track layout exhibiting substantial track to track offsets that may be operated on in accordance with different embodiments of the present invention.

Turning to FIG. 14, an example track to track layout 1400 exhibiting substantial track to track offsets shows a situation where three distinct sync marks are used across adjacent tracks. In particular, track layout 1400 includes: a track 1405 that includes a 2 T preamble following by a first sync data (sync data 1); a track 1410 that includes a 2 T preamble followed by a second sync data (sync data 2); a track 1415 that includes a 2 T preamble followed by a third sync data (sync data 3); a track 1420 that includes a 2 T preamble following by a first sync data (sync data 1); a track 1425 that includes a 2 T preamble followed by a second sync data (sync data 2); a track 1430 that includes a 2 T preamble followed by a third sync data (sync data 3); and a track 1435 that includes a 2 T preamble following by a first sync data (sync data 1). Of note, many more than the seven depicted tracks may be included.

None of the three sync marks (sync data 1, sync data 2 and sync data 3) is adjacent to a track utilizing the same sync mark, and the sync marks are selected such that they are maximally separate from each other in terms of correlation. This allows for detecting a reflection (i.e., inter-track interference from a given sync mark in the adjacent track. In the case where the data is misaligned like that shown in track layout 1400, the sync mark from one track is reflected at a non-sync mark location in an adjacent track. In particular, sync data 1 from track 1405 is reflected in both sync data 2 and bit 2,1 of track 1410; sync data 2 from track 1410 is reflected in both 2 T preamble and sync data 1 of track 1405, and in both sync data 3 and bit 3,1 of track 1415; sync data 3 from track 1415 is reflected in both 2 T preamble and sync data 2 of track 1410, and in both 2 T preamble and sync data 1 of track 1420; sync data 1 from track 1420 is reflected in both sync data 3 and bit 3,1 of track 1415, and in both 2 T preamble and sync data 2 of track 1425; sync data 2 from track 1425 is reflected in both sync data 1 and bit 4,1 of track 1420, and in sync data 3, bit 6,1 and bit 6,2 of track 1430; and sync data 3 from track 1430 is reflected in both 2 T preamble and sync data 2 of track 1425, and in both 2 T preamble and sync data 1 of track 1435.

Referring again to FIG. 13, the equalized output 1303 is also provided to a current track sync mark detector circuit 1355. Current track sync mark detector circuit 1355 queries the equalized output 1303 for a sync mark included in the data stream. When the sync mark of the current track is identified in equalized output 1303, a current sync found signal 1357 is asserted. It should be noted that in some cases only the pattern corresponding to the current track sync mark is queried in making a determination as to whether to assert current sync found signal 1357. In other cases where additional robustness is desired, a combination of the pattern corresponding to the current track sync mark and at least a portion of a preceding preamble pattern is queried in making a determination as to whether to assert current sync found signal 1357. In another embodiment of the present invention, the sync mark detection is done using inter-track interference compensated output 1332 in place of equalized output 1303.

Current sync found signal 1357, next sync found signal 1353 and previous sync found signal 1352 are provided to a phase difference calculator circuit 1360. Phase difference calculator circuit calculates offset 1362 between previous sync found signal 1352 and the current sync found signal 1357, and offset 1363 between next sync found signal 1353 and the current sync found signal 1357, and provides these offsets as inputs to inter-track interference response estimation circuit 1320 and inter-track interference estimator circuit 1325. Inter-track interference response estimation circuit 1320 and inter-track interference estimator circuit 1325 use the received offsets information to align data output 1312 (i.e., $a_{-1}[n]$) from previous track buffer 1310 and data output 1314 from next track buffer 1315 with equalized output 1303 (i.e., $r[n]$).

In another embodiment of the current invention, the previous track and next track sync mark reflection detector circuit 1350 is replaced with a previous track and next track phase alignment pre-processor 1370. Equalized output 1303, data output 1312 from previous track buffer 1310, data output 1314 from next track buffer 1315 and current track sync found signal 1357 from current track sync mark detector circuit 1355 are provided as inputs to the phase alignment pre-processor 1370. The previous track and next track phase alignment pre-processor estimates inter-track interference responses of very long lengths for previous track and next track. The location of the maximum coefficient in the estimated inter-track interference responses from previous track and next track are output as initial phase estimate for previous track 1372 and initial phase estimate for next track 1373. The estimated initial phases 1372 and 1373 are provided as inputs to inter-track response estimator circuit 1320 and inter-track signal estimator circuit 1325 to appropriately align the data output 1312 from previous track buffer 1310 and data output 1314 from next track buffer 1315 with the equalized output 1303. Estimation of inter-track interference responses for phase estimation is performed using the same algorithm described above in connection with FIG. 14 over a short block of samples (e.g., 3000) from the beginning of the sector. Based upon the disclosure provided herein, one of ordinary skill in the art will recognize a variety of methods and/or architectures that may be used in relation to different embodiments of the present invention to locate the phase offsets of data written on previous track and next track with that on current track. It is also worthy of mention that the phase offset estimation performed by phase alignment pre-processor 1370 and sync mark reflection detector circuit 1350 in conjunction with phase difference calculator circuit 1360 are operating to make the mis-aligned sector format in FIG. 2b effectively look like the aligned sector format in FIG. 2c.

It should be noted that the approach discussed in relation to inter-track interference compensation circuit 1300 estimates phase offsets of previous track and next track with current track and cancels inter-track interference from both a previous and a next track. The approach may be simplified to cancel inter-track interference from only one of the previous track or the next track, with alignment only with the sync mark from the corresponding track being completed.

Figure 15:
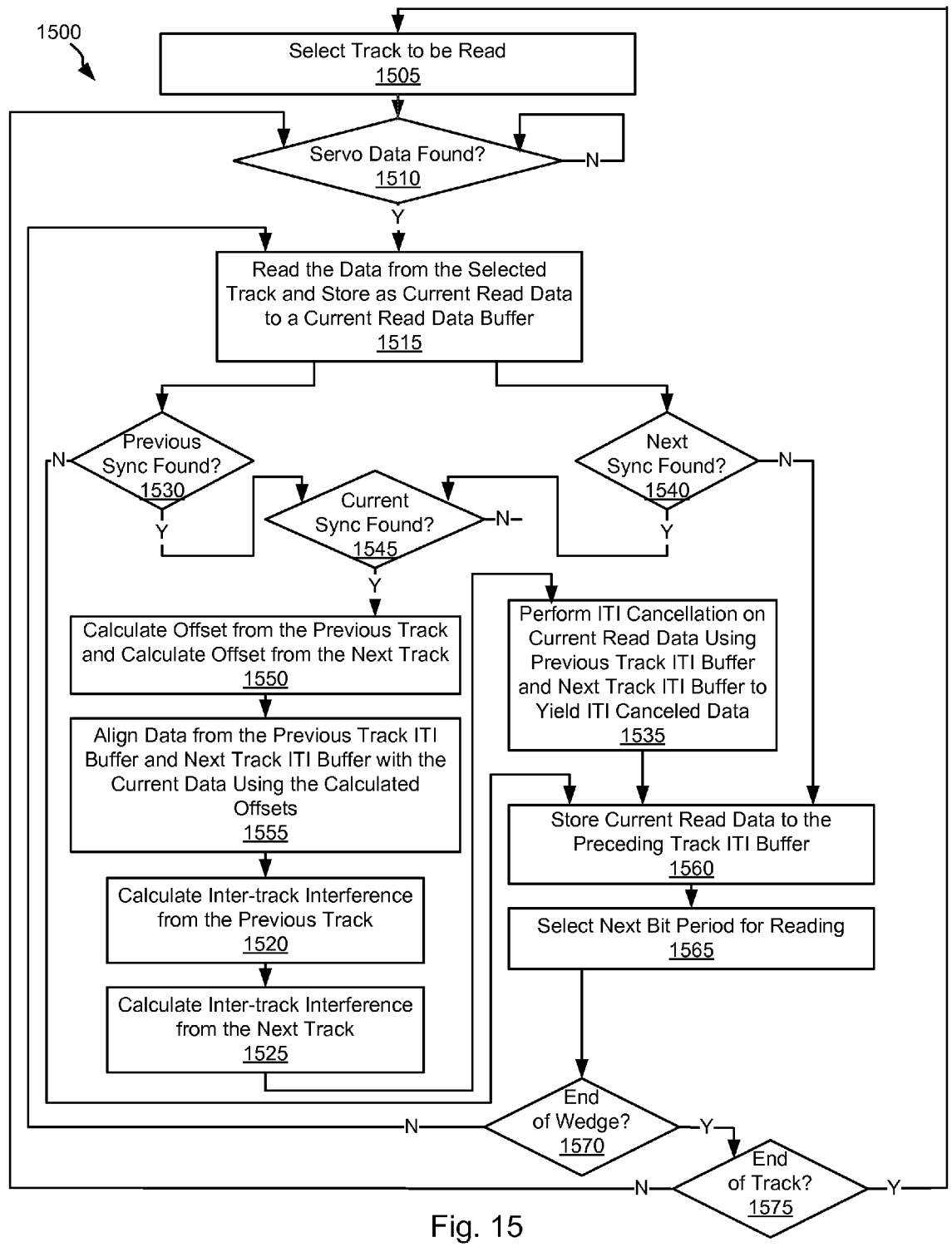
FIG. 15 is a flow diagram showing a method in accordance with some embodiments of the present invention for offset compensation in an inter-track interference cancellation approach.

Turning to FIG. 15, a flow diagram 1500 shows a method in accordance with some embodiments of the present invention for offset compensation in an inter-track interference cancellation approach. Following flow diagram 1500, a track to be read is selected (block 1505). Prior to making such a selection the hard data corresponding to the next track and the previous track have been loaded into respective inter-track interference buffers. Thus, using track layout 1400 as an example, where track 1420 is selected for reading, a preceding track inter-track interference buffer holding the hard data corresponding to track 1415 is loaded, and the data corresponding to track 1425 was previously loaded into a next track inter-track interference buffer.

A read/write head assembly is positioned relative to the selected track and it is determined whether the servo wedge data has been identified (block 1510). Once the servo wedge data has been found and processed (block 1510), data is read from the selected track and stored as current read data to a current read data buffer (bock 1515). In addition, the read data from the current track is queried to determine whether the sync mark from the previous track is included (block 1525). In some cases, more than just the pattern corresponding to the previous track sync mark is queried. For example, a combination of the pattern corresponding to the previous track sync mark and at least a portion of a preceding preamble pattern is queried. Similarly, the read data from the current track is queried to determine whether the sync mark from the next track is included (block 1540). Again, in some cases, more than just the pattern corresponding to the next track sync mark is queried. In addition, the read data from current track is queried to determine whether the sync mark from the current track is included (block 1545). Again, in some cases, more than just the pattern corresponding to the current track sync mark is queried.

Where the sync mark from the previous track is identified (block 1530), the sync mark from the next track is identified (block 1540) and the current sync mark is identified (block 1545), a first offset between the previous track and the current track is calculated and a second offset between the next track and the current track is calculated (block 1550). These offsets are then used to align the data from the previous track inter-track interference buffer and the data from the next track inter-track interference buffer with the current data (bock 1555). The inter-track interference from the previous track ($\{\hat{r}_{-1}[n]\}$) is calculated (block 1520), and the inter-track interference from the next track ($\{\hat{r}_{1}[n]\}$) is calculated (block 1525). The inter-track interference from the next track and the inter-track interference from the previous track are subtracted from the currently read data to yield the inter-track interference canceled data ($\{\hat{r}_{0}[n]\}$) (block 1535). In addition, the current data is stored to the previous track inter-track interference buffer (block 1560), and the next bit period is selected for reading (block 1565).

Alternatively, where the sync marks for the previous track, the next track and the current track are not yet found (block 1530, block 1540, block 1545), the current data is stored to the previous track inter-track interference buffer (block 1560), and the next bit period is selected for reading (block 1565). It is determined if the end of the wedge (i.e., the region between servo data wedges) has been reached (block 1570). Where the end of the wedge has not yet been reached (block 1570), the processes of blocks 1515-1565 is repeated for the next block. Alternatively, where the end of the wedge has been reached (block 1570), it is determined whether the end of the track has been reached (block 1575). Where the end of the track has not yet been reached (block 1575), the processes of blocks 1510-1565 are repeated for the remaining portion of the current track. Otherwise, the next track is selected and the processes of blocks 1510-1565 are repeated for the next track.

Figure 16:
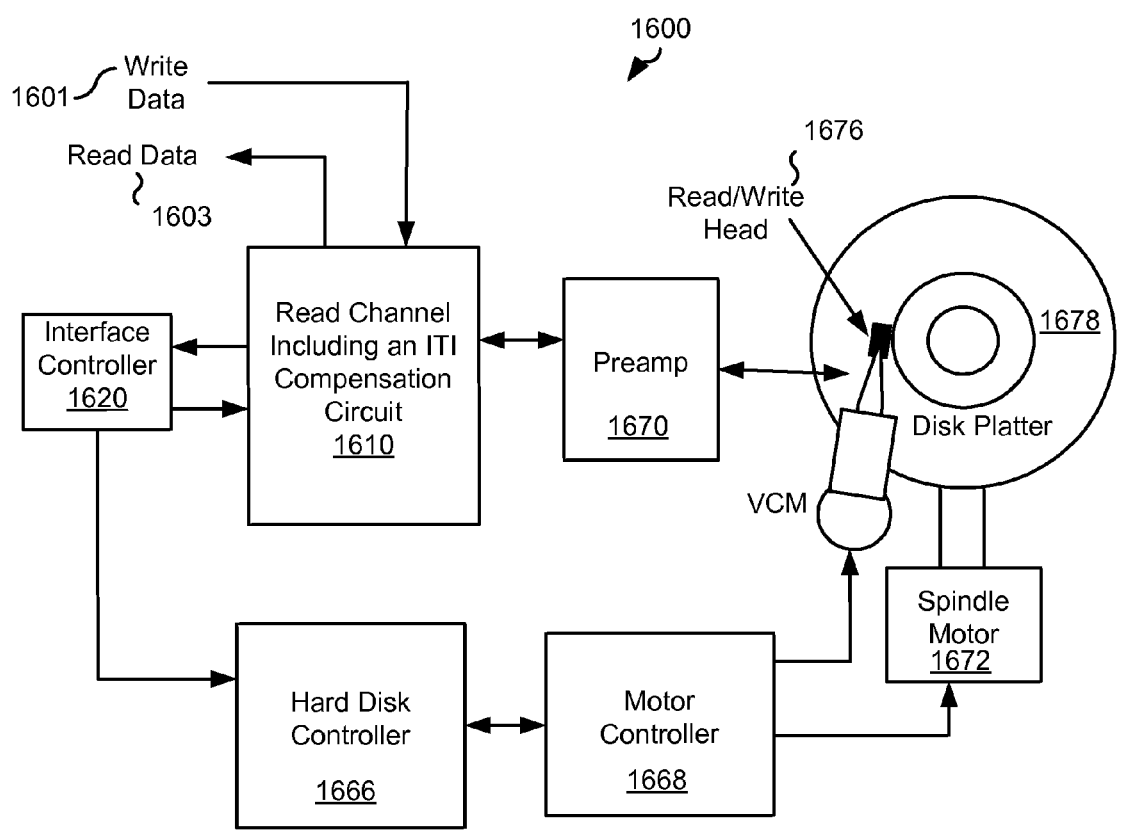
FIG. 16 shows a storage system with an inter-track interference compensation circuit in accordance with various embodiments of the present invention.

Turning to FIG. 16, a storage system 1600 is shown including a read channel circuit 1610 with an inter-track interference compensation circuit in accordance with various embodiments of the present invention. Storage system 1600 may be, for example, a hard disk drive. Storage system 1600 also includes a preamplifier 1670, an interface controller 1620, a hard disk controller 1666, a motor controller 1668, a spindle motor 1672, a disk platter 1678, and a read/write head 1676. Interface controller 1620 controls addressing and timing of data to/from disk platter 1678. The data on disk platter 1678 consists of groups of magnetic signals that may be detected by read/write head assembly 1676 when the assembly is properly positioned over disk platter 1678. In one embodiment, disk platter 1678 includes magnetic signals recorded in accordance with either a longitudinal or a perpendicular recording scheme.

In a typical read operation, read/write head assembly 1676 is accurately positioned by motor controller 1668 over a desired data track on disk platter 1678. Motor controller 1668 both positions read/write head assembly 1676 in relation to disk platter 1678 and drives spindle motor 1672 by moving read/write head assembly to the proper data track on disk platter 1678 under the direction of hard disk controller 1666. Spindle motor 1672 spins disk platter 1678 at a determined spin rate (RPMs). Once read/write head assembly 1678 is positioned adjacent the proper data track, magnetic signals representing data on disk platter 1678 are sensed by read/write head assembly 1676 as disk platter 1678 is rotated by spindle motor 1672. The sensed magnetic signals are provided as a continuous, minute analog signal representative of the magnetic data on disk platter 1678. This minute analog signal is transferred from read/write head assembly 1676 to read channel 1610 via preamplifier 1670. Preamplifier 1670 is operable to amplify the minute analog signals accessed from disk platter 1678. In turn, read channel circuit 1610 decodes and digitizes the received analog signal to recreate the information originally written to disk platter 1678. This data is provided as read data 1603 to a receiving circuit. As part of processing the received information, read channel circuit 1610 performs an inter-track interference compensation. Such an inter-track interference compensation circuit may be implemented similar to that described above in relation to FIG. 3, FIG. 5, FIG. 7, FIG. 8, FIG. 11 and/or FIG. 13, and/or may operate similar to the method discussed in relation to FIG. 4, FIG. 6, FIG. 9, FIG. 10, FIG. 12, and/or FIG. 15. A write operation is substantially the opposite of the preceding read operation with write data 1601 being provided to read channel circuit 1610. This data is then encoded and written to disk platter 1678.

It should be noted that storage system 1600 may be integrated into a larger storage system such as, for example, a RAID (redundant array of inexpensive disks or redundant array of independent disks) based storage system. It should also be noted that various functions or blocks of storage system 1600 may be implemented in either software or firmware, while other functions or blocks are implemented in hardware.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for processing data from a storage medium. While detailed descriptions of one or more embodiments of the invention have been given above, various alternatives, modifications, and equivalents will be apparent to those skilled in the art without varying from the spirit of the invention. For example, one or more embodiments of the present invention may be applied to various data storage systems and digital communication systems, such as, for example, tape recording systems, optical disk drives, wireless systems, and digital subscriber line systems. Therefore, the above description should not be taken as limiting the scope of the invention, which is defined by the appended claims.

What is claimed is:

1. A non-zero gap, inter-track interference compensation circuit, the compensation circuit comprising:

an inter-track interference determination circuit operable to calculate an inter-track interference from a previous track data set based at least in part on the previous track data set and a current track data set, wherein the previous track data set includes a gap, wherein a portion of the data in the previous track data set corresponds to a previous track on a storage medium, and wherein the data in the previous track data set corresponding to the gap corresponds to a track preceding a previous track.

2. The circuit of claim 1, wherein the circuit further comprises:
a data buffer operable to store the previous track data set; and
a hard data load circuit operable determine a location of the gap and to load the previous track data set into the data buffer.

3. The circuit of claim 2, wherein the gap is an unused area between a sync mark region and a user data region.

4. The circuit of claim 3, wherein at least a portion of the user data region is written with data corresponding to the track preceding the previous track, and is overwritten with data corresponding to the previous track.

5. The circuit of claim 3, wherein at least a portion of the sync mark region is written with data corresponding to the track preceding the previous track, and is overwritten with data corresponding to the previous track.

6. The circuit of claim 3, wherein at least a portion of the gap is written with data corresponding to the track preceding the previous track, and is not overwritten with data corresponding to the previous track.

7. The circuit of claim 2, wherein the gap is written with data corresponding to the track preceding the previous track.

8. The circuit of claim 2, wherein the inter-track interference determination circuit comprises:
an inter-track interference response circuit operable to estimate an inter-track interference response from the previous track data set based at least in part on the previous track data set and a current track data set; and
an inter-track interference signal estimator circuit operable to calculate an inter-track interference from the previous track data set based at least in part on the previous track data set and the inter-track interference response from the previous track data set.

9. The circuit of claim 1, wherein the circuit is implemented as part of an integrated circuit.

10. The circuit of claim 1, wherein the circuit is deployed as part of a hard disk drive.

11. The circuit of claim 1, wherein the circuit further comprises:
an inter-track interference cancellation circuit operable to cancel the inter-track interference from the previous track data set to yield a compensated output.

12. A method for cancelling inter-track interference in a non-zero gap data set, the method comprising:
receiving a current track data set derived from a current track on a storage medium;
accessing a previous track data set, wherein the previous track data set was at least in part derived from a previous track on the storage medium, and wherein the previous track data set includes a gap having data that corresponds to a track preceding the previous track on the storage medium
calculating an estimated inter-track interference response from the previous track data set based at least in part on the current track data set and the previous track data set; and
calculating an inter-track interference from the previous track data set based at least in part on the previous track data set and the inter-track interference response from the previous track data set.

13. The method of claim 12, wherein the method further comprises:
cancelling the inter-track interference from the previous track data set to yield a compensated output.

14. The method of claim 12, wherein the gap is an unused area between a sync mark region and a user data region.

15. The method of claim 14, wherein at least a portion of the user data region and at least a portion of the sync mark region are written with data corresponding to the track preceding the previous track, and are overwritten with data corresponding to the previous track.

16. The method of claim 14, wherein at least a portion of the gap is written with data corresponding to the track preceding the previous track, and is not overwritten with data corresponding to the previous track.

17. The method of claim 12, wherein the gap is written with data corresponding to the track preceding the previous track.

18. A data storage device, the data storage device comprising:
a storage medium;
a read/write head assembly disposed in relation to the storage medium;
a read channel circuit operable to receive an information set from the storage medium via the read/write head assembly, the read channel circuit including:
a front end circuit operable to convert the information set to a current track data set;
a data buffer;
a hard data load circuit operable determine a location of a gap in a data set derived from a previous track and to load a previous track data set into the data buffer, wherein the previous track data set includes data corresponding to the previous track for locations other than the location of the gap and includes data from a track preceding the previous track at the location of the gap; and
an inter-track interference determination circuit operable to calculate an inter-track interference from the previous track data set based at least in part on the previous track data set and a current track data set.

19. The storage device of claim 18, wherein the inter-track interference determination circuit comprises:
an inter-track interference response circuit operable to estimate an inter-track interference response from the previous track data set based at least in part on the previous track data set and a current track data set; and
an inter-track interference signal estimator circuit operable to calculate an inter-track interference from the previous track data set based at least in part on the previous track data set and the inter-track interference response from the previous track data set.

20. The storage device of claim 18, wherein the read channel circuit further comprises:
an inter-track interference cancellation circuit operable to cancel the inter-track interference from the previous track data set to yield a compensated output.

* * * * *